United States Patent
Yu

(10) Patent No.: US 9,404,246 B2
(45) Date of Patent: Aug. 2, 2016

(54) SELF-CLOSING WATER SAVING DEVICE, METHOD AND TOILET

(75) Inventor: Jiwei Yu, Zhoushan (CN)

(73) Assignee: Chaoan Wanton Sanitaryware Co. Ltd., Chaozhou, Guangdong Province (CN)

( * ) Notice: Subject to any disclaimer, the term of this patent is extended or adjusted under 35 U.S.C. 154(b) by 280 days.

(21) Appl. No.: 13/825,517

(22) PCT Filed: Sep. 9, 2011

(86) PCT No.: PCT/CN2011/079506
§ 371 (c)(1),
(2), (4) Date: Mar. 21, 2013

(87) PCT Pub. No.: WO2012/037853
PCT Pub. Date: Mar. 29, 2012

(65) Prior Publication Data
US 2013/0185859 A1    Jul. 25, 2013

(30) Foreign Application Priority Data
Sep. 21, 2010   (CN) .......................... 2010 1 0288355

(51) Int. Cl.
*E03D 1/24*   (2006.01)
*E03D 1/32*   (2006.01)
*F16K 31/26*  (2006.01)

(52) U.S. Cl.
CPC .. *E03D 1/24* (2013.01); *E03D 1/32* (2013.01); *F16K 31/26* (2013.01); *E03D 2201/30* (2013.01)

(58) Field of Classification Search
CPC ............... E03D 1/24; E03D 1/14; E03D 3/02; E03D 3/04
USPC ............. 4/415, 326, 351, 366, 374, 391, 425; 137/423, 425, 409, 434, 410, 411
See application file for complete search history.

(56) References Cited

U.S. PATENT DOCUMENTS

| 5,301,374 A | * | 4/1994 | Smiley ............................ 4/341 |
| 5,862,538 A | | 1/1999 | Ho |
| 6,173,456 B1 | | 1/2001 | Nieto |
| 6,205,595 B1 | | 3/2001 | Ecker |

(Continued)

FOREIGN PATENT DOCUMENTS

| CN | 2459369 Y | 11/2001 |
| CN | 2492614 Y | 5/2002 |

(Continued)

OTHER PUBLICATIONS

Bingbing Han, International Search Report, International Application No. PCT/CN2011/079506, Dec. 1, 2011, 6 pages, State Intellectual Property Office of the P.R. China, Beijing China.

(Continued)

*Primary Examiner* — Huyen Le
*Assistant Examiner* — Christine Skubinna
(74) *Attorney, Agent, or Firm* — Crain, Caton & James

(57) ABSTRACT

Disclosed are a self-closing water saving device, method, and toilet. The self-closing water saving device for mounting in a tank of a toilet bowl is used for supplying water to the tank, and is characterized by comprising: a water inlet adapted to be connected to an external water source, a water outlet adapted to provide water to the tank, and a jet-propelling port for jetting water to the bottom of a water trap of the toilet bowl or the bottom of a sewer; wherein, when the tank discharges water to the water trap, the water jetted from the jet-propelling port is used to propel the water which is discharged from the tank and flows into the water trap, the bottom of the water trap, or the bottom of the sewer.

11 Claims, 27 Drawing Sheets

(56) References Cited

U.S. PATENT DOCUMENTS

2003/0101509 A1* 6/2003 Noburu et al. .................. 4/425
2013/0068321 A1* 3/2013 Guthrie ....................... 137/434

FOREIGN PATENT DOCUMENTS

| CN | 2503130 Y | 7/2002 |
| CN | 101956416 A | 1/2011 |
| KR | 100555834 B1 | 3/2006 |

OTHER PUBLICATIONS

Office Action (and Translation) for Russian Patent Application No. 201370042/31; Nov. 14, 2015; 3 pgs.

\* cited by examiner

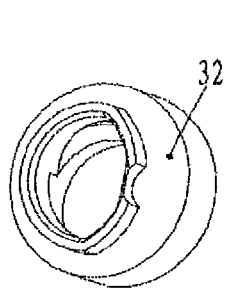 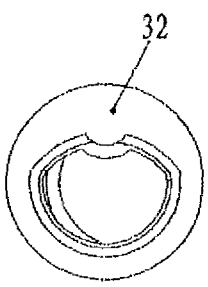 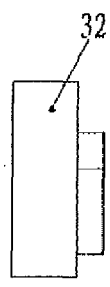 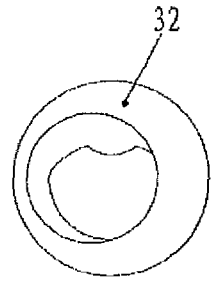
Figure 39  Figure 40  Figure 41  Figure 42
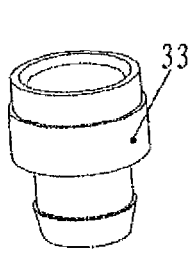 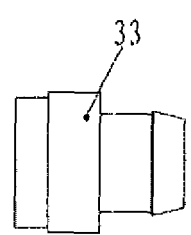 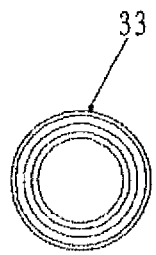
Figure 43  Figure 44  Figure 45
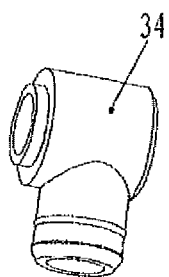 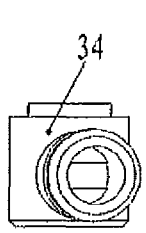 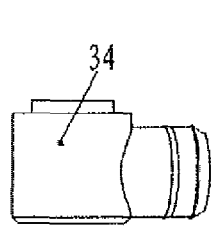 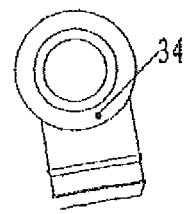
Figure 46  Figure 47  Figure 48  Figure 49
  
Figure 50  Figure 51  Figure 52
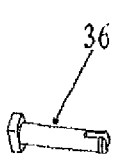 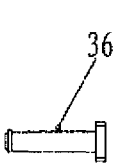 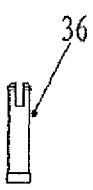
Figure 53  Figure 54  Figure 55

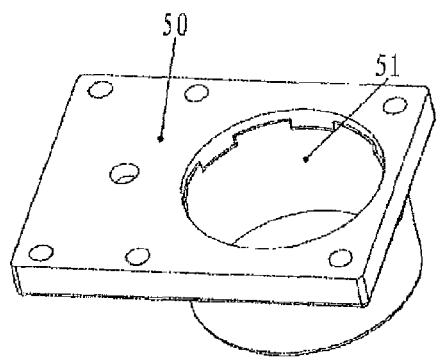
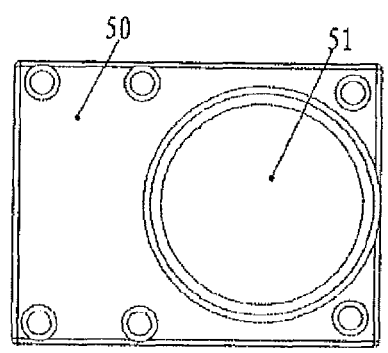
Figure 75   Figure 76
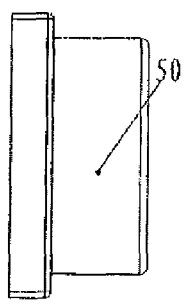
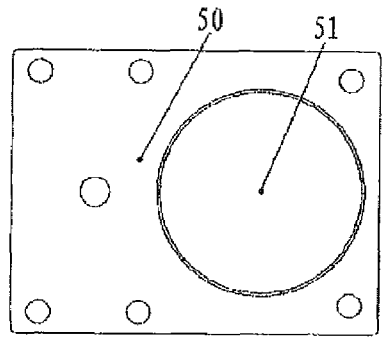
Figure 77   Figure 78
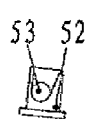   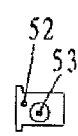
Figure 79   Figure 80   Figure 81   Figure 82
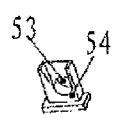   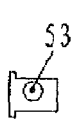
Figure 83   Figure 84   Figure 85   Figure 86
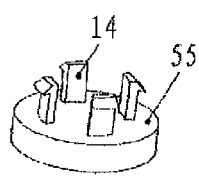 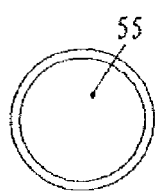 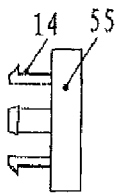 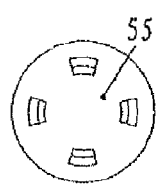
Figure 87   Figure 88   Figure 89   Figure 90

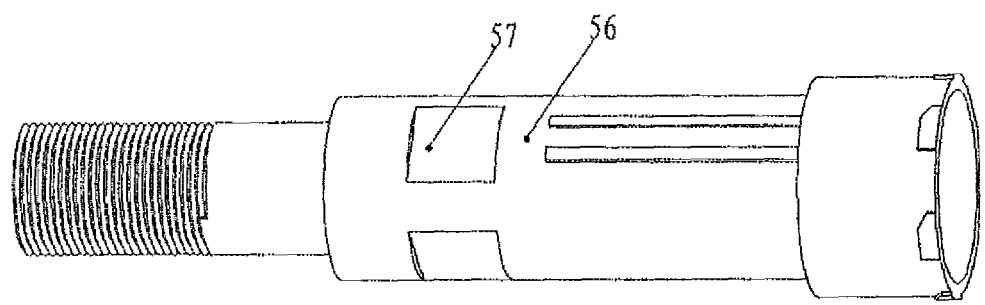
Figure 91
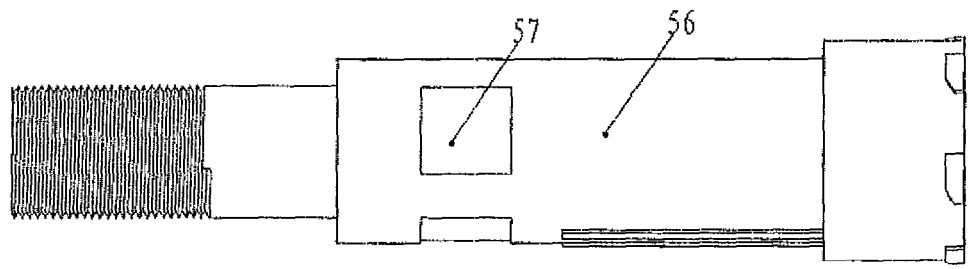
Figure 92
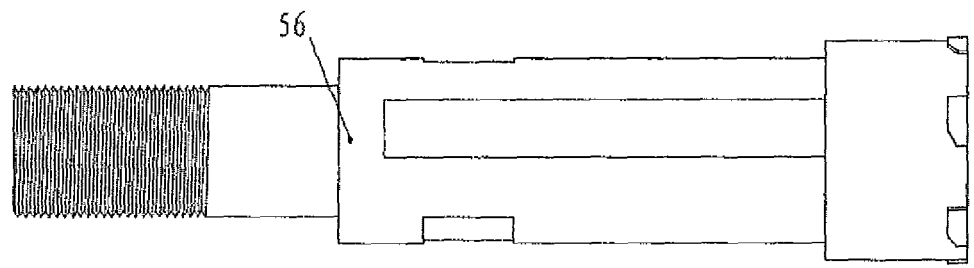
Figure 93
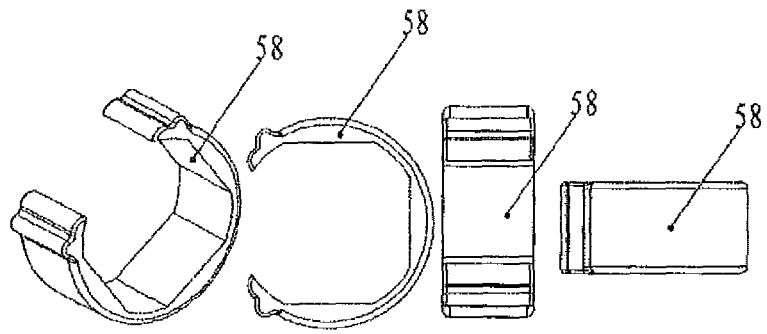
Figure 94    Figure 95    Figure 96    Figure 97

SELF-CLOSING WATER SAVING DEVICE, METHOD AND TOILET

CROSS-REFERENCE TO RELATED APPLICATIONS

This application claims priority from PCT/CN2011/079506 filed Sep. 9, 2011, which claims priority from Chinese Patent No. 201010288355.7 filed Sep. 21, 2010, both of which are incorporated herein by reference.

TECHNICAL FIELD

The present invention relates to a self-closing water saving device for supplying the water to a tank of a toilet bowl and a toilet bowl mounted with such device.

TECHNICAL BACKGROUND

The water trap of the existing toilet bowl is generally flushed only by water discharged from the tank. Although a jet orifice is arranged in the bottom of the water trap, the water jetted from the jet orifice is also from the tank. The pressure of the water from the tank is very low due to a limited height of the tank, thus pretty much water is needed to flush the water trap cleanly. Some toilet bowls may be flushed completely by using the pressed water such as the running water directly, but they require high water pressure, such as above 300 Kpa, and loud noise is generated when the toilet bowl is flushed. If the water pressure is insufficient, it is very difficult to flush the toilet bowl cleanly.

The existing self-closing water inflowing device utilizing float, which is used for supplying water to the tank of the toilet bowl, generally has only one water inlet connected to an external water source and one water outlet for supplying the water to the tank. For a certain toilet bowl, the top wall inside the toilet bowl cannot be cleaned since the water discharged from the tank cannot reach the toilet bowl seat. Therefore, a self-closing water inflowing device utilizing float especially for the toilet bowl with the low tank is available in the market, and although the device includes one more water outlet than a common self-closing water inflowing device utilizing float, the water from the water outlet flows towards the toilet bowl seat to clean the top wall inside the toilet bowl.

SUMMARY OF THE INVENTION

An object of the present invention is to provide a float-controlled valve, a self-closing water saving device, a method and a toilet bowl, which can satisfy both the purpose of flushing the dirt by using a water source with a high pressure or an external water source with a low pressure and the purpose of saving water.

A self-closing water saving device for mounting in a tank of a toilet bowl, which is used for supplying the water to the tank, is characterized by including: a water inlet adapted to be connected to an external water source, a water outlet adapted to provide water to the tank, and a jet-propelling port for jetting water to the bottom of a water trap of the toilet bowl or the bottom of a sewer; wherein, when the tank discharges water to the water trap, the water jetted from the jet-propelling port is used to propel the water which is discharged from the tank and flows into the water trap, the bottom of the water trap, or the bottom of the sewer.

In the self-closing water saving device, the self-closing water saving device has a structure with a primary valve and a secondary valve in series, a water flow from the primary valve flows to the secondary valve, and successively or synchronously flows to the jet-propelling port and the water outlet via the secondary valve.

In the self-closing water saving device, when a discharging assembly in the tank is opened to discharge water to the water trap of the toilet bowl, both the primary valve and the secondary valve are opened, then the secondary valve is closed after a while, and subsequently the primary valve is closed when the tank is filled with water.

In the self-closing water saving device, a water inflowing part inside the secondary valve includes a water outflowing slot in communication with the outside of the body of the secondary valve.

In the self-closing water saving device, the water outflowing slot is blocked when the secondary valve is opened.

The self-closing water saving device further includes a primary valve float can, a secondary valve float can, a primary valve float and a secondary valve float, wherein, the secondary float is placed in the secondary valve float can, and the primary valve float is placed in the primary valve float can; the opening and closing of the secondary valve is controlled by the secondary valve float, the opening and closing of the primary valve is controlled by the primary valve float, and a floating body receiving hole in which a floating body acting as a check valve is arranged is provided at the bottom of each of the primary and secondary valve float cans.

In the self-closing water saving device, the secondary valve float is completely inside the secondary valve float can and there is still a certain distance between a top of the secondary valve float and an upper edge of the secondary valve float can when the secondary valve float uplifts to its highest position, wherein, an upper edge of the primary valve float can is lower than that of the secondary valve float can, and water does not flow to the secondary valve float can until the primary valve float can is filled with water.

In the self-closing water saving device, the primary valve is closed when the primary valve float uplifts, and is opened when the primary valve float drops; the secondary valve is in an openable state or opened when the secondary valve float uplifts, and is closed when the secondary valve float drops; the opening size of the check valve of the secondary valve float can is less than that of the check valve of the primary valve float can, and the secondary valve float drops after the primary valve float has dropped for a time period.

The present invention further provides a self-closing water saving device, which includes a water inlet adapted to be connected to an external water source, a water outlet adapted to provide water to the tank, a jet-propelling port for jetting water to the bottom of a water trap of a toilet bowl or the bottom of a sewer; and a primary valve and a secondary valve which are float-controlled valves, wherein, a water inflowing part of the secondary valve is in communication with a water outflowing part of the primary valve, the secondary valve float is completely inside the secondary valve float can and there is still a certain distance between a top of the secondary valve float and an upper edge of the secondary valve float can when the secondary valve float uplifts to its highest position, the upper edge of the secondary valve float can is higher than that of the primary valve float can, water is not allowed to flow to the secondary valve float can until the primary valve float can is filled with water, an opening size of a check valve of the secondary valve float can is less than that of a check valve of the primary valve float can, the secondary valve float drops after the primary valve float has dropped for a time period, a connection rod mechanism of the secondary valve is adapted to open a hole in a secondary valve bonnet along with the uplifting of the secondary valve float, a connection rod mechanism of the primary valve is adapted to close a hole in a primary valve bonnet along with the uplifting of the primary valve float, the water outflowing part of the secondary valve is in communication with the jet-propelling port, and the secondary valve further includes a water outflowing slot which is in communication with the water outlet through which the water flows out to the tank.

The present invention further provides a toilet bowl including a tank and a water trap. A jet-propelling orifice is arranged in the water trap, the bottom of the water trap, or the bottom of a sewer, and a self-closing water saving device which includes a water inlet adapted to be connected to an external water source, a water outlet adapted to provide water to the tank and a jet-propelling port for jetting water to the bottom of the water trap or the bottom of the sewer, is arranged in the tank, and the self-closing water saving device. Here, the jet-propelling port is connected to the jet-propelling orifice.

The present invention further provides a water saving method for a toilet bowl, a tank of which receives a self-closing water saving device, provided that the tank does not contain water initially, and the method includes steps of (a) opening a hole in the primary valve bonnet, and closing a hole in the secondary valve bonnet; (b) supplying water to a water inflowing part of the primary valve from an external water source, with the primary valve being kept open and the secondary valve being kept closed, so that the water from the water inflowing part of the primary valve flows through the valve port of the primary valve, a water outflowing part of the primary valve, a water inflowing part of the secondary valve and a water outflowing slot of the secondary valve, and finally into the tank; (c) as the water level in the tank rises gradually and the water in the tank flows into the primary valve float can, uplifting the primary valve float, which causes the connection rod mechanism to close the hole in the primary valve bonnet, hence close the primary valve, and further stop supplying water to the tank; (d) guiding the water in the tank to the secondary valve float can, to cause the float in the secondary valve float can to uplift, wherein the uplifted float causes the connection rod mechanism to open the hole in the secondary valve bonnet, so that the secondary valve is maintained at an openable state; (e) opening a water discharging assembly of the toilet bowl to discharge the water in the tank into the water trap of the toilet bowl; (f) opening a check valve when the water level in the tank drops, wherein, the water discharging velocity of the primary valve float can is larger than that of the secondary valve float can; (g) driving the connection rod mechanism by the drop of the primary valve to open the hole in the primary valve bonnet, so that the primary valve is maintained in an openable state, and simultaneously controlling the water discharging velocity of the secondary valve float can to keep the hole in the secondary valve bonnet open and hence keep the secondary valve in an openable state; (h) supplying the water to the water inflowing part of the primary valve from the external water source again, to cause the water flow from the water inflowing part of the primary valve to flow through the port of the primary valve, the water outflowing part of the primary valve, the water inflowing part of the secondary valve, the valve port of the secondary valve and the water outflowing part of the secondary valve, and then into the jet-propelling port or respectively into the water outflowing slot of the secondary valve and the jet-propelling port, wherein, the water from the water outflowing slot of the secondary valve flows into the tank, and the water jetted from the jet-propelling port propels the water which is discharged from the tank and flows into the water trap, the bottom of the water trap, or the bottom of the sewer; (i) controlling the water discharging velocity of the secondary valve float can to control the water jetting time of the jet-propelling port, and driving the connection rod mechanism by the drop of the float in the secondary valve float can to close the hole in the secondary valve bonnet, and hence close the secondary valve, when a preset time period of water jetting elapses; and (j) repeating steps (a)-(i).

The advantageous effect of the present invention lies in that: when water is discharged from the tank, the jet-propelling port in the self-closing water saving device is opened, so that the water flow from the tank to the water trap can be propelled by the water jetted from the jet-propelling port from the external water source, which can improve the velocity in which the water flow discharged from the tank rushes to the sewer, so as to make the flushing of the toilet bowl more powerful and more water-saving.

BRIEF DESCRIPTION OF THE DRAWINGS

The specific characters and performances of the present invention are further given by embodiments and the attached drawings.

FIGS. 1-4 show a schematic view and three side views of the combined primary-secondary valve body of the self-closing water saving device of the present invention, wherein, FIG. 1 is a perspective view, FIG. 2 is a front view, FIG. 3 is a bottom view and FIG. 4 is a rear view.

FIGS. 5, 6, 7 and 8 are a schematic view and three side views of a combined primary-secondary bonnet of the self-closing water saving device of the present invention, wherein, FIG. 5 is a perspective view, FIG. 6 is a bottom view, FIG. 7 is a front view and FIG. 8 is a top view.

FIGS. 9, 10, 11 and 12 are a schematic view and three side views of a piston body of a primary valve of the self-closing water saving device of the present invention, wherein, FIG. 9 is a perspective view, FIG. 10 is a front view, FIG. 11 is a right view and FIG. 12 is a rear view.

FIGS. 13, 14, 15 and 16 are a schematic view and three side views of a piston body of a secondary valve of the self-closing water saving device of the present invention, wherein, FIG. 13 is a perspective view, FIG. 14 is a front view, FIG. 15 is a right view and FIG. 16 is a rear view.

FIGS. 17, 18, 19 and 20 are a schematic view and three side views of a piston body cup of the self-closing water saving device of the present invention, wherein, FIG. 17 is a perspective view, FIG. 18 is a front view, FIG. 19 is a right view and FIG. 20 is a rear view.

FIGS. 21a, 21b and 21c are a schematic view and three side views of a bottom plate for piston body of the self-closing water saving device of the present invention, wherein, FIG. 21a is a perspective view, FIG. 21b is a front view and FIG. 21c is a right view.

FIGS. 22, 23, 24 and 24a are a schematic view and three side views of a piston body sealing plate of the self-closing water saving device of the present invention, wherein, FIG. 22 is a perspective view, FIG. 23 is a front view, FIG. 24 is a left view and FIG. 24a is a rear view.

FIGS. 25, 26 and 26a are a schematic view and three side views of a sealing ring of the inner bottom plate of the valve body of the self-closing water saving device of the present invention, wherein, FIG. 25 is a perspective view, FIG. 26 is a front view, FIG. 26a is a left view.

FIGS. 31, 32, 33 and 34 are a schematic view and three side views of a primary valve piston assembly of the self-closing water saving device of the present invention, wherein, FIG. 31 is a perspective view, FIG. 32 is a front view, FIG. 33 is a left view and FIG. 34 is a rear view.

FIGS. 35, 36, 37 and 38 are a schematic view and three side views of a secondary valve piston assembly of the self-closing water saving device of the present invention, wherein, FIG. 35 is a perspective view, FIG. 36 is a front view, FIG. 37 is a left view and FIG. 38 is a rear view.

FIGS. 39, 40, 41 and 42 are a schematic view and three side views of an eccentric joint of the self-closing water saving device of the present invention, wherein, FIG. 39 is a perspective view, FIG. 40 is a front view, FIG. 41 is a left view and FIG. 42 is a rear view.

FIGS. 43, 44 and 45 are a schematic view and three side views of a jet-propelling joint of the self-closing water saving device of the present invention, wherein, FIG. 43 is a perspective view, FIG. 44 is a front view and FIG. 45 is a right view.

FIGS. 46, 47, 48 and 49 are a schematic view and three side views of a water outflowing joint of the self-closing water saving device of the present invention, wherein, FIG. 46 is a perspective view, FIG. 47 is a front view, FIG. 48 is a left view and FIG. 49 is a top view (rotated by a predetermined angle).

FIGS. 50, 51 and 52 are a schematic view and three side views of an adjustment weight piece of the self-closing water saving device of the present invention, wherein, FIG. 50 is a perspective view, FIG. 51 is a front view and FIG. 52 is a left view.

FIGS. 53, 54 and 55 are a schematic view and three side views of a valve arm rotating shaft of the self-closing water saving device of the present invention, wherein, FIG. 53 is a perspective view, FIG. 54 is a front view and FIG. 55 is a top view (rotated by 90°).

FIGS. 56, 57 and 58 are a schematic view and three side views of a primary valve arm of the self-closing water saving device of the present invention, wherein, FIG. 58 is a perspective view, FIG. 57 is a front view and FIG. 56 is a right view.

FIGS. 59, 60 and 61 are a schematic view and three side views of a secondary valve arm of the self-closing water saving device of the present invention, wherein, FIG. 61 is a perspective view, FIG. 60 is a front view and FIG. 59 is a right view.

FIGS. 62, 63 and 64 are a schematic view and three side views of a primary valve connection rod of the self-closing water saving device of the present invention, wherein, FIG. 64 is a perspective view, FIG. 63 is a front view and FIG. 62 is a right view.

FIGS. 65, 66 and 67 are a schematic view and three side views of a secondary valve connection rod of the self-closing water saving device of the present invention, wherein, FIG. 67 is a perspective view, FIG. 66 is a front view and FIG. 65 is a right view.

FIGS. 68, 69, 70, 71 and 72 are a schematic view and three side views of an inner bottom plate of the valve body of the self-closing water saving device of the present invention, wherein, FIGS. 68 and 70 are perspective views of different views, FIG. 69 is a front view, FIG. 72 is a rear view and FIG. 71 is a right view.

FIGS. 75, 76, 77 and 78 are a schematic view and three side views of an outer bottom plate of the body of the self-closing water saving device of the present invention, wherein, FIG. 75 is a perspective view, FIG. 76 is a front view, FIG. 77 is a right view and FIG. 78 is a rear view.

FIGS. 79, 80, 81 and 82 are a schematic view and three side views of a left eccentric float rotating base of the self-closing water saving device of the present invention, wherein, FIG. 79 is a perspective view, FIG. 80 is a front view, FIG. 81 is a left view and FIG. 82 is a rear view.

FIGS. 83, 84, 85 and 86 are a schematic view and three side views of a right eccentric float rotating base of the self-closing water saving device of the present invention, wherein, FIG. 83 is a perspective view, FIG. 84 is a front view, FIG. 85 is a left view and FIG. 86 is a rear view.

FIGS. 87, 88, 89 and 90 are a schematic view and three side views of a floating body of the self-closing water saving device of the present invention, wherein, FIG. 87 is a perspective view, FIG. 88 is a front view, FIG. 89 is a left view and FIG. 90 is a rear view.

FIGS. 91, 92 and 93 are a schematic view and three side views of a water inflowing tube of the self-closing water saving device of the present invention, wherein, FIG. 91 is a perspective view, FIG. 92 is a front view and FIG. 93 is a bottom view.

FIGS. 94, 95, 96 and 97 are a schematic view and three side views of a float can clip of the self-closing water saving device of the present invention, wherein, FIG. 94 is a perspective view, FIG. 95 is a front view, FIG. 96 is a left view and FIG. 97 is a rear view.

FIGS. 100, 101 and 102 are three side views of a float can of the self-closing water saving device of the present invention, wherein, FIG. 100 is a front view, FIG. 101 is a bottom view, and FIG. 102 is a rear view.

FIGS. 103, 104, 105 and 106 are a schematic view and three side views of a primary valve float of the self-closing water saving device of the present invention, wherein, FIG. 103 is a perspective view, FIG. 104 is a front view, FIG. 105 is a top view and FIG. 106 is a left view.

FIGS. 107, 108, 109 and 110 are a schematic view and three side views of a secondary valve float of the self-closing water saving device of the present invention, wherein, FIG. 107 is a perspective view, FIG. 108 is a front view, FIG. 109 is a top view and FIG. 110 is a left view.

DETAILED DESCRIPTION OF PREFERRED EMBODIMENTS

Figure 1:
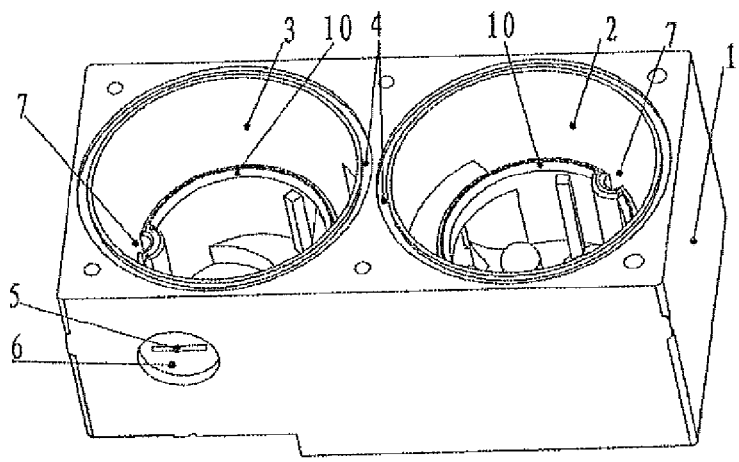
Figure 2:
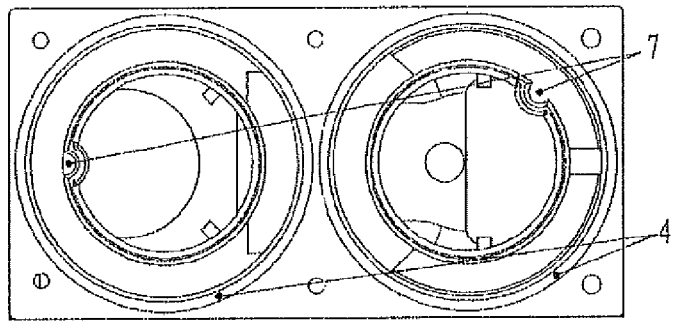
Figure 3:
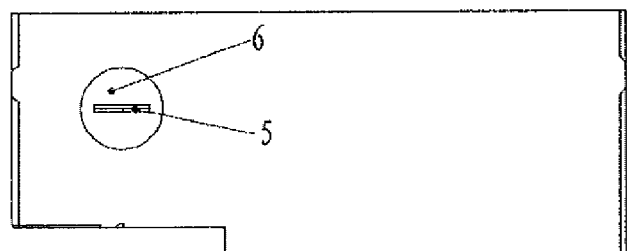
Figure 4:
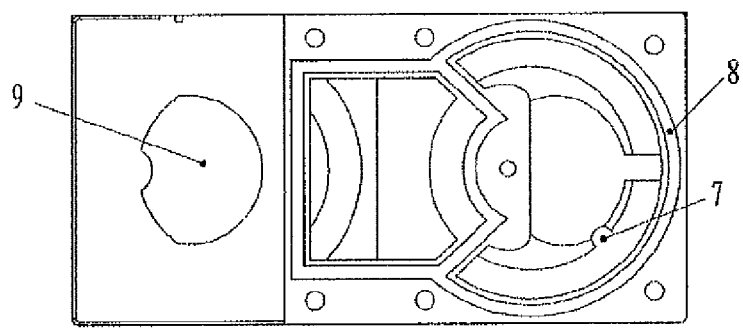
Figure 5:
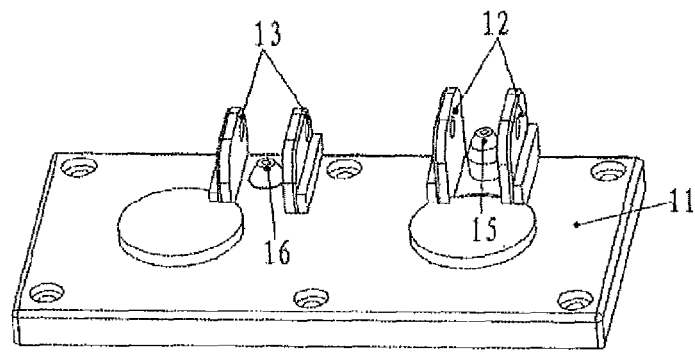
Figure 6:
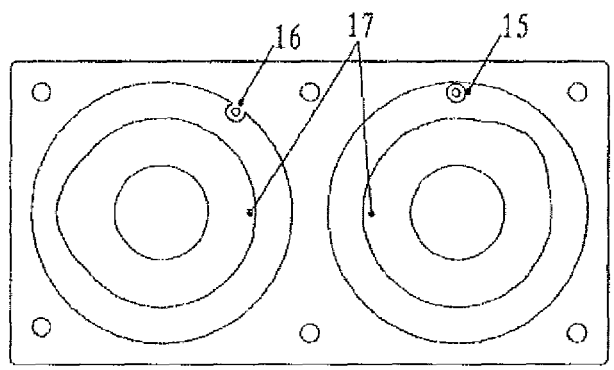
Figure 7:
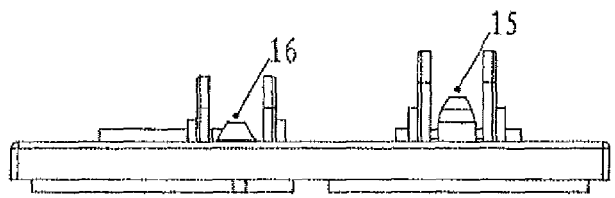
Figure 8:
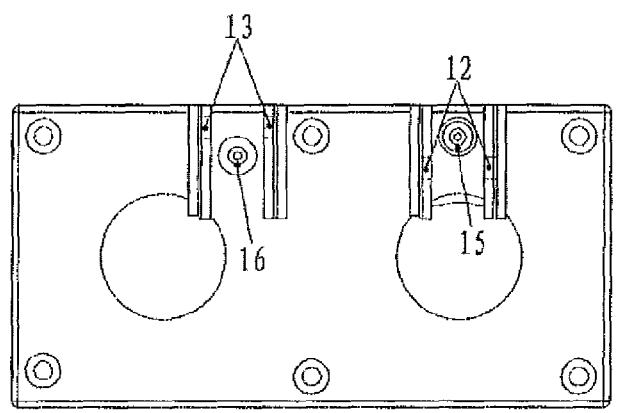
Figures 9, 10, 11, 12:
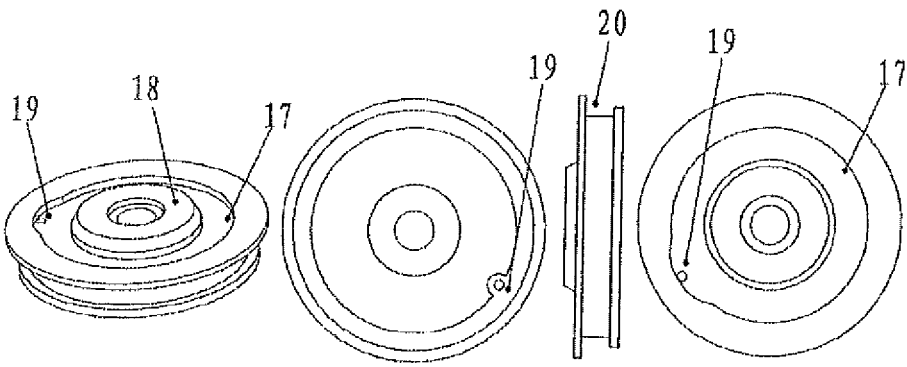
Figures 13, 14, 15, 16:
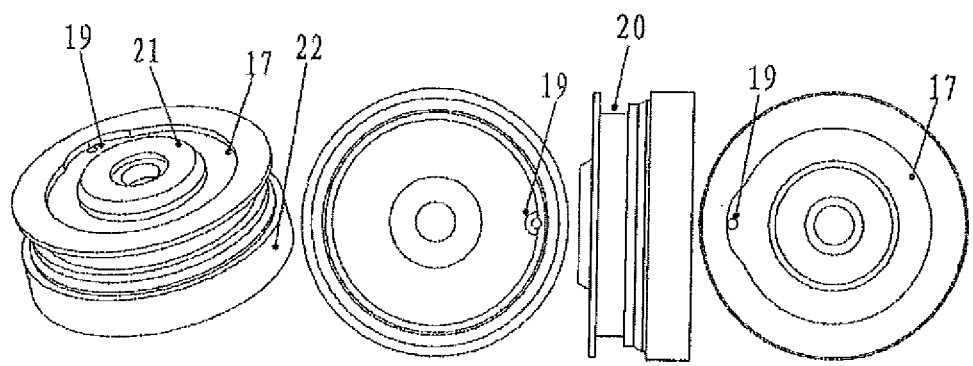
Figures 17, 18, 19, 20:
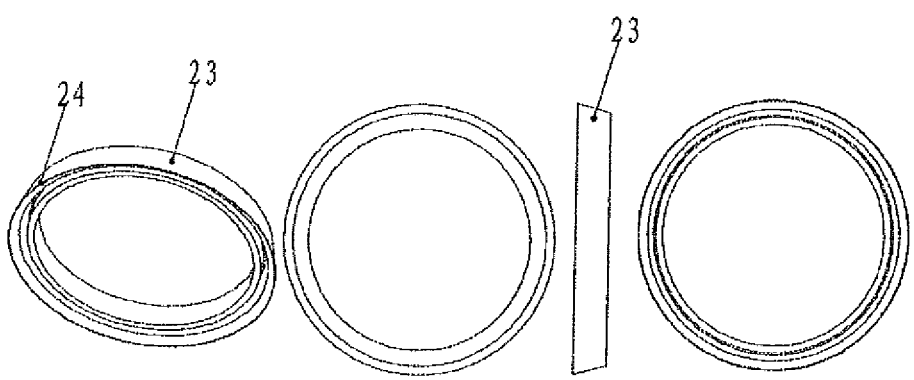
Figures 21A, 21B, 21C:
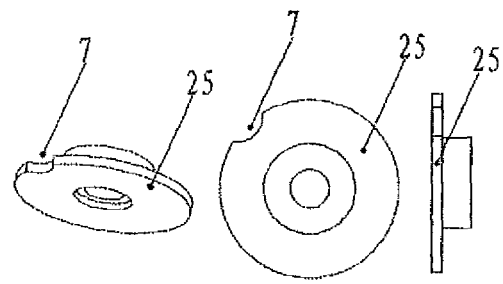
Figures 22, 23, 24, 24A:
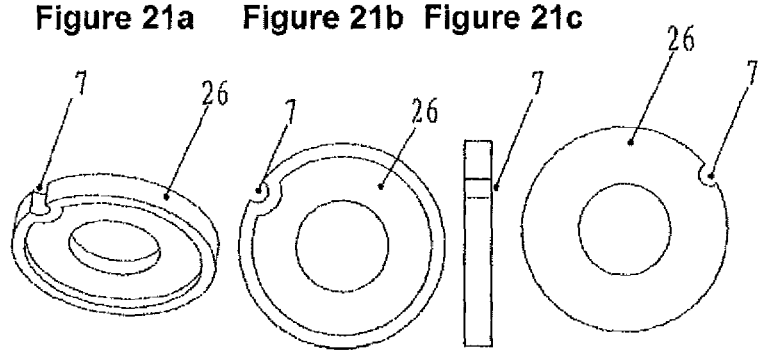
Figures 25, 26, 26A:
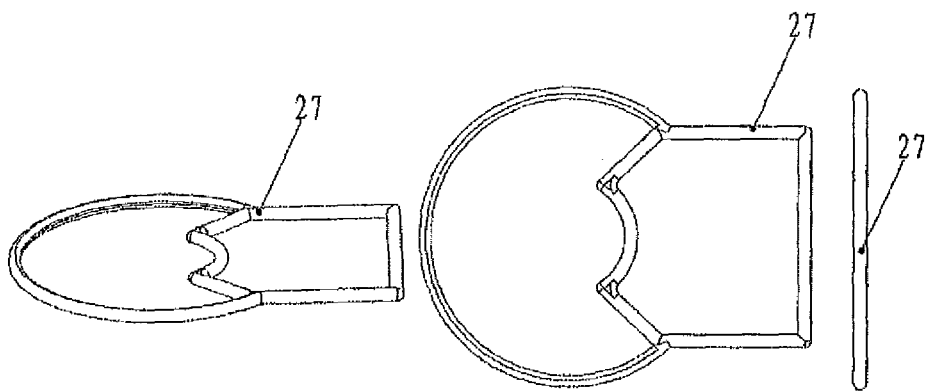
Figures 27, 28, 29, 30:
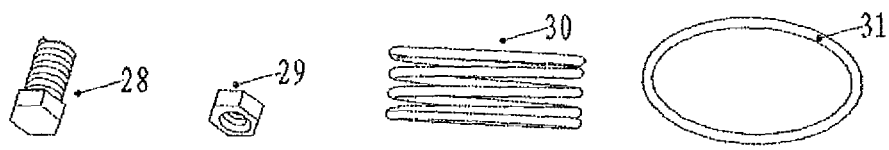
FIG. 27 is a schematic view of a connecting screw of a piston assembly of the self-closing water saving device of the present invention.
FIG. 28 is a schematic view of a connecting nut of the piston assembly of the self-closing water saving device of the present invention.
FIG. 29 is a schematic view of a spring of the piston assembly of the self-closing water saving device of the present invention.
FIG. 30 is a schematic view of a sealing ring of a water inflowing tube of the self-closing water saving device of the present invention.
Figure 31:
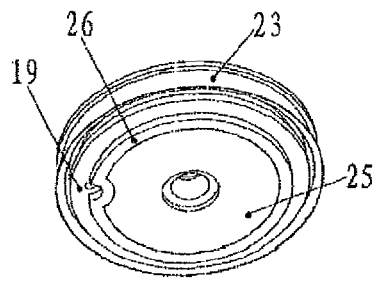
Figures 32, 33, 34:
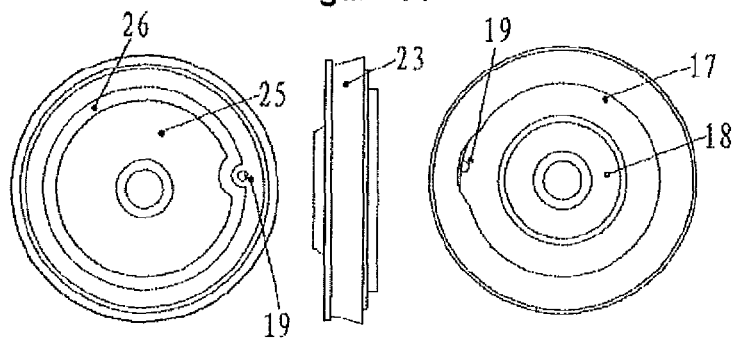
Figure 35:
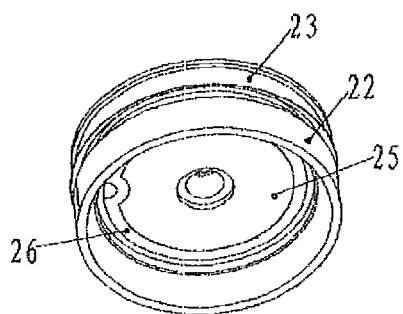
Figures 36, 37, 38:
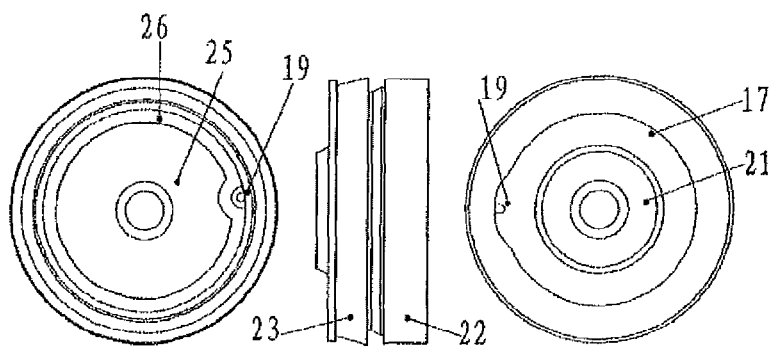
Figures 56, 57, 58, 59, 60, 61:
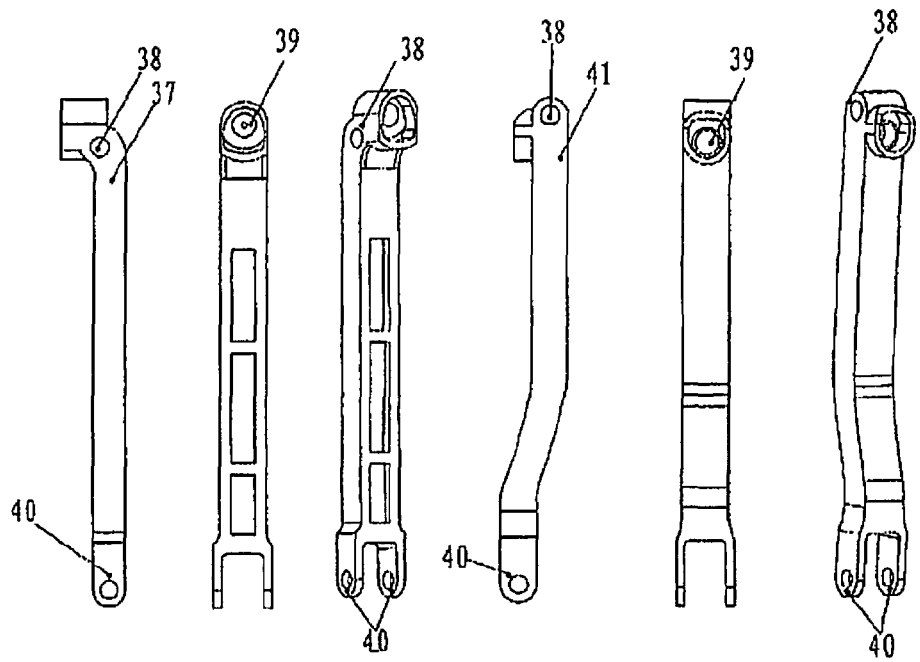
Figures 62, 63, 64, 65, 66, 67:
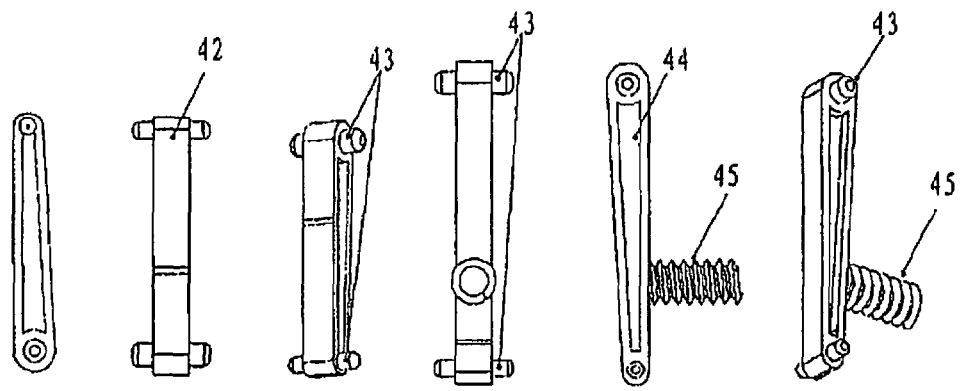
Figure 68:
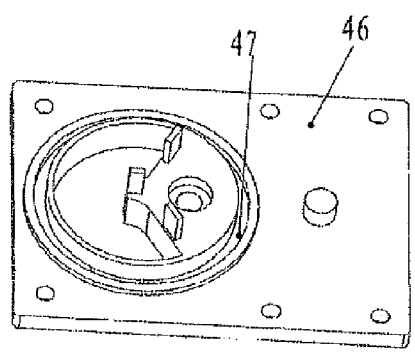
Figure 69:
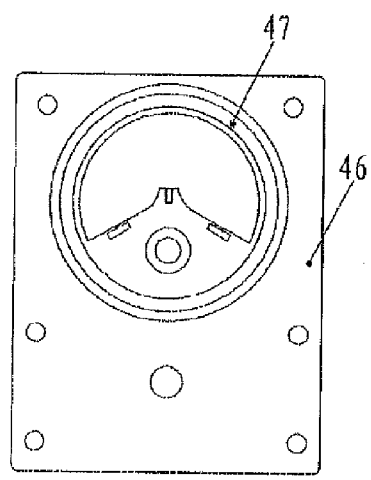
Figure 70:
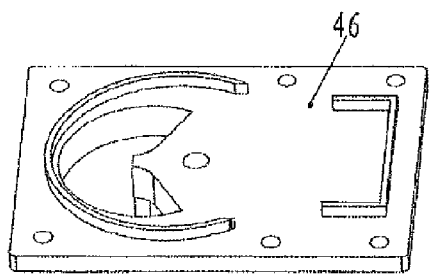
Figures 71, 72:
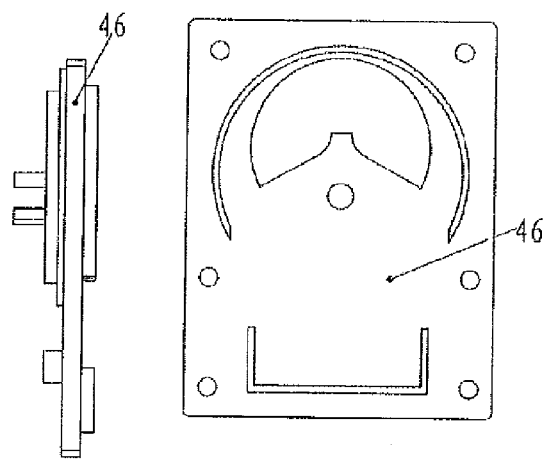
Figure 73:
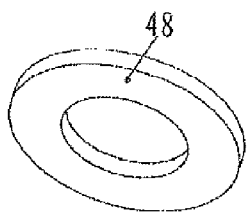
FIG. 73 is a schematic view of a water inflowing tube gasket of the self-closing water saving device of the present invention.
Figure 74:
FIG. 74 is a schematic view of a rubber plug for valve arm of the self-closing water saving device of the present invention.
Figure 98:
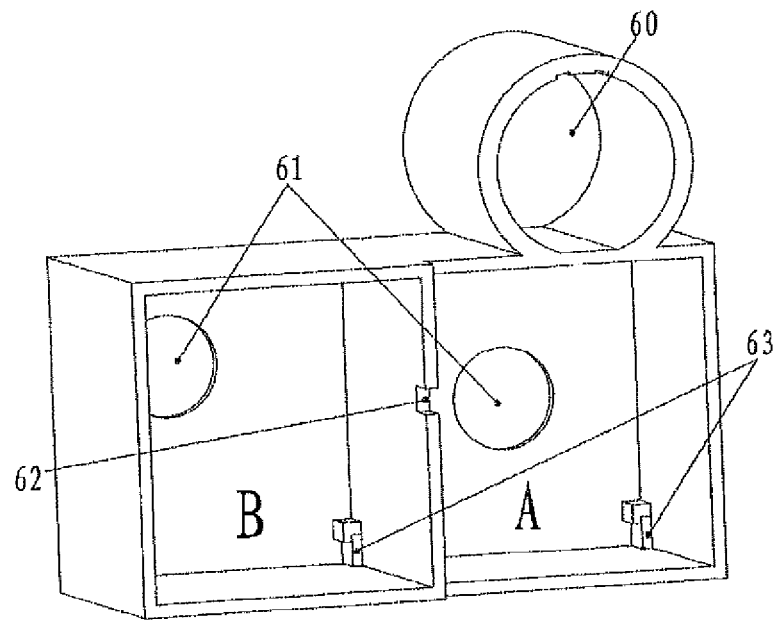
FIGS. 98 and 99 are schematic views of a float can of the self-closing water saving device of the present invention.
Figure 99:
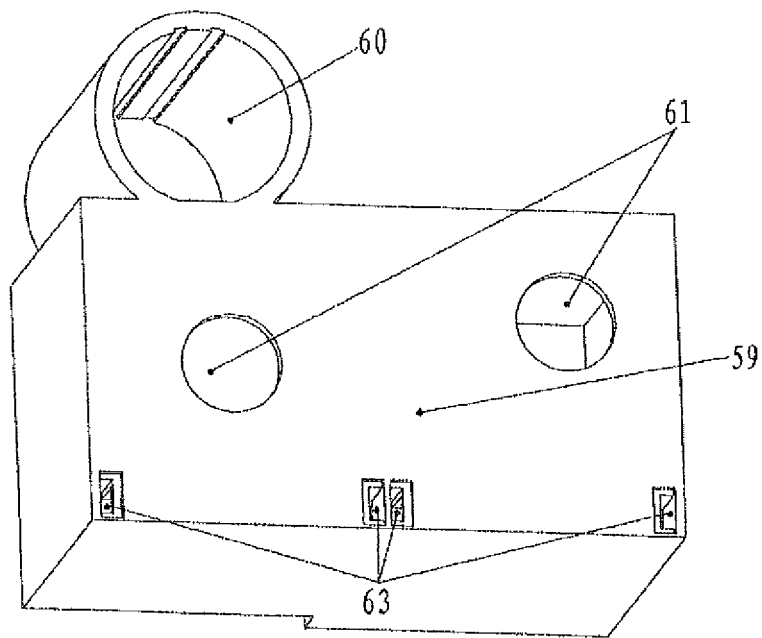
Figure 100:
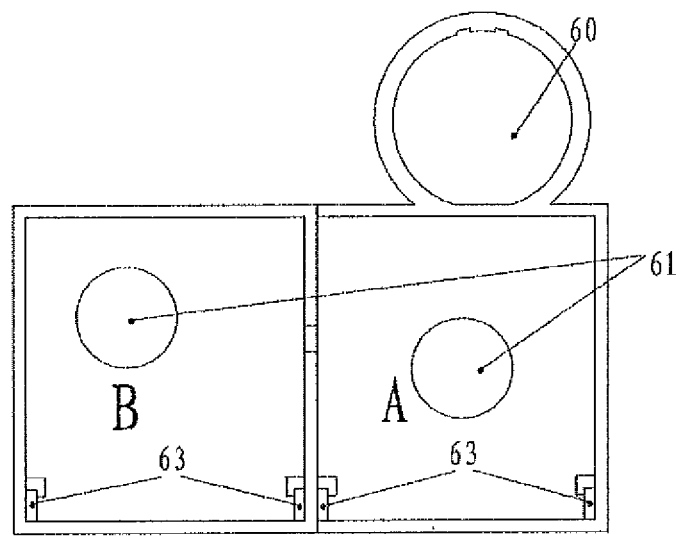
Figure 101:
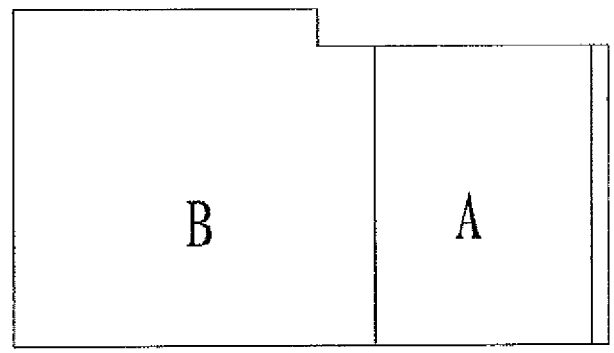
Figure 102:
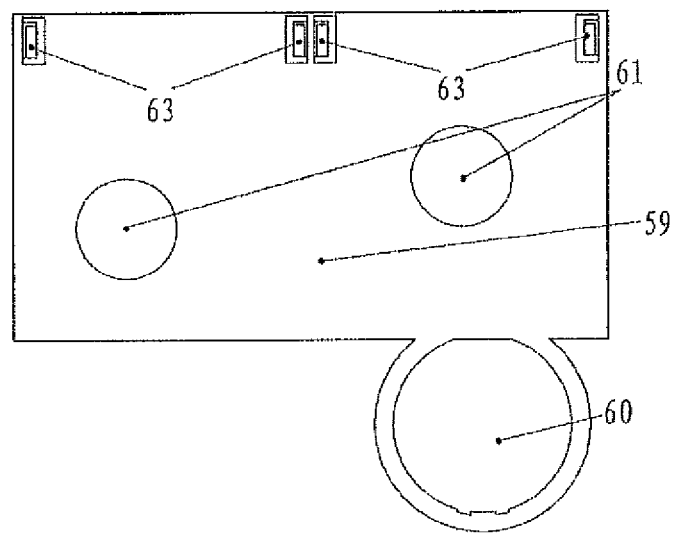
Figures 103, 104:
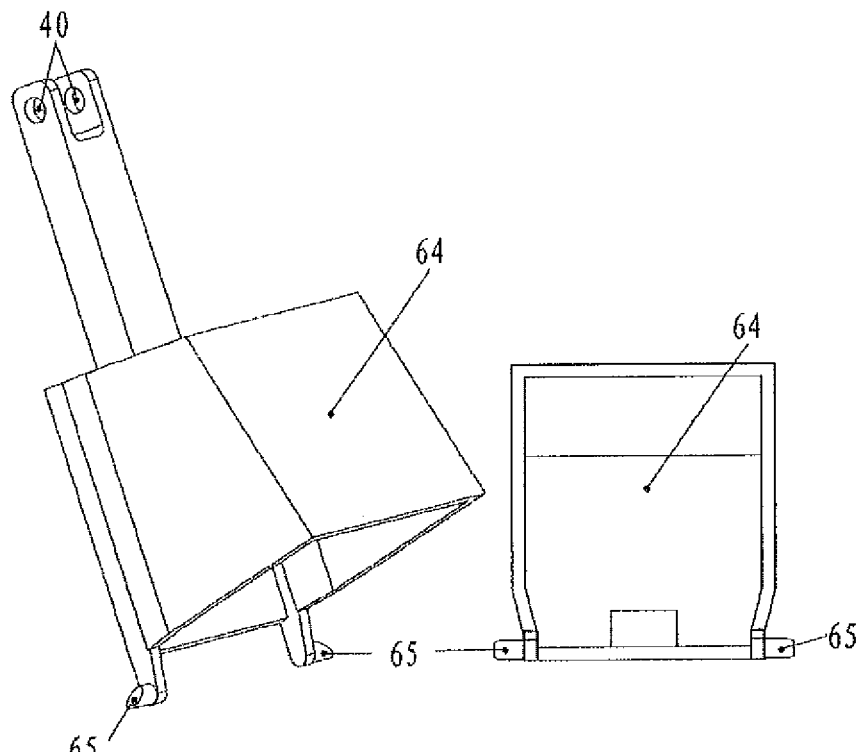
Figures 105, 106:
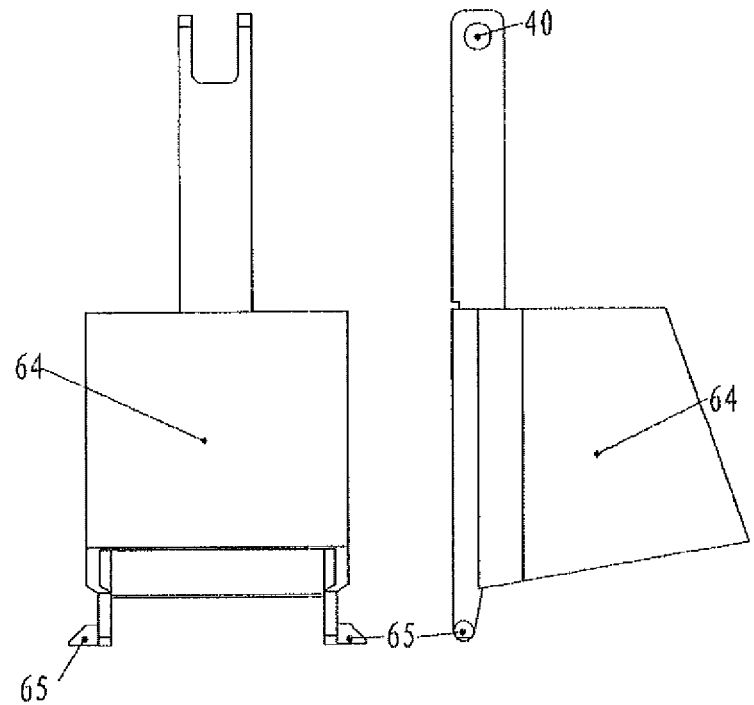
Figures 107, 108:
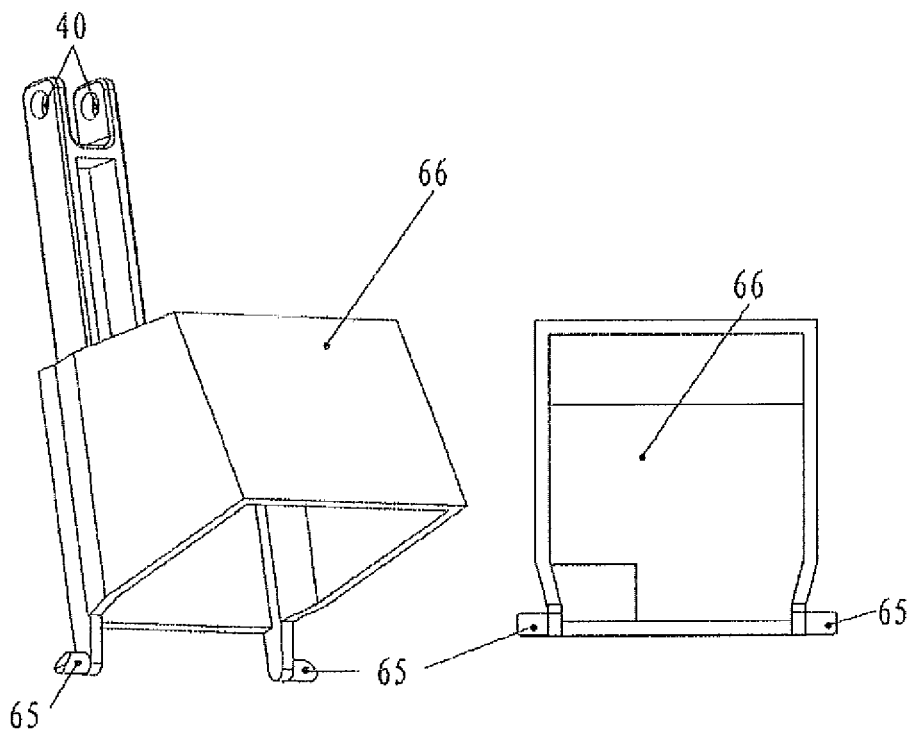
Figures 109, 110:
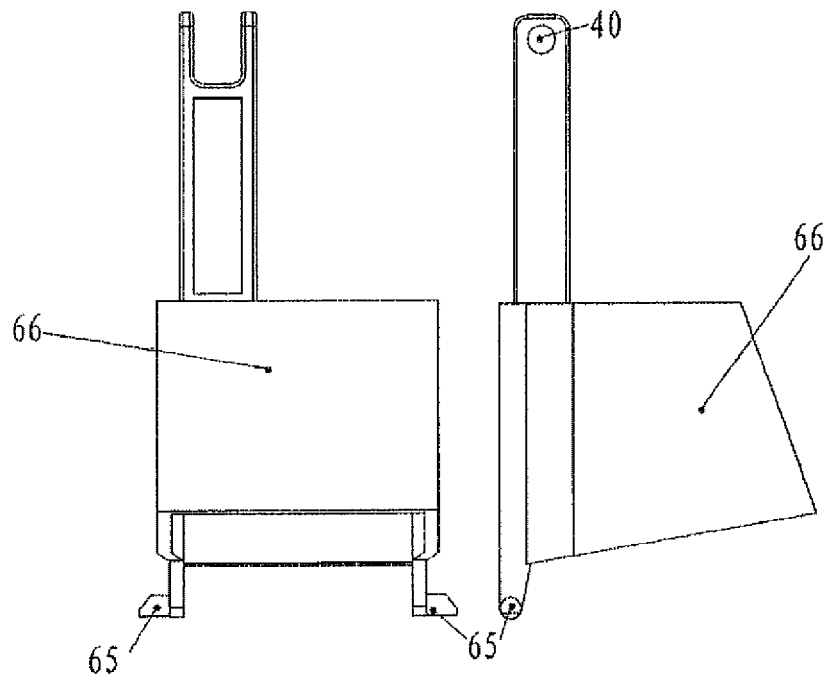

In order to unify technical terms, the float control valve is defined as follows: it includes a body, a core, a bonnet, floats and a float can; the body is arranged with the core therein, and has a water inlet and a water outlet which are in communication via a valve port; the core is arranged in the body movably, separates the interior of the body into an upper part and a lower part, and has an up-down through hole; the bonnet is on the top of the body to cover the body; a spring is arranged between the bonnet and the core, presses the core to the valve port to block the valve port; an inside-outside through hole is arranged in the bonnet. The elastic force of the spring is associated with a pressure difference between the upper and lower parts of the core, and when there is a predetermined pressure difference between the lower part and the upper part of the core, the spring is compressed to move the core and open the valve port; floats are placed in the float can, and connected to the bonnet via a connection rod mechanism which provides a sealing material; the sealing material selectively closes or opens the hole in the bonnet with the movement of the connection rod mechanism, and the water outlet in the bottom of the float can is arranged with a unidirectional valve.

Referring to FIGS. 1-4, sealing ring grooves 4 for the combined primary-secondary bonnet, a primary valve chamber 2, a secondary valve chamber 3, valve ports 10, notches 7 on the valve ports 10, a water outlet 6, and a water outflowing slot 5 in the water outlet 6 that is in communication with the secondary valve chamber 3 are arranged at the front side of a combined primary-secondary valve body 1, and an eccentric joint receiving hole 9 and a sealing ring groove 8 for an inner bottom plate are arranged in the bottom of the secondary valve part of the combined primary-secondary valve body 1.

Here, both the primary valve chamber 2 and the secondary valve chamber 3 are designed such that water flows in peripherally but flows out centrally from the chambers, and a valve port 10 of a central water outflowing part of the primary valve chamber 2 is in communication with the peripheral water inflowing part of the secondary valve chamber 3.

Referring to FIGS. 5-8, a pressure release hole 15 of the primary valve, a pressure release hole 16 of the secondary valve, rotating shaft receiving holes 12 of the primary valve arm and rotating shaft receiving holes 13 of the secondary valve arm are arranged on the combined primary-secondary bonnet 11. It can be seen from FIG. 8 that the pressure release hole 15 of the primary valve is at one side of the rotating shaft receiving holes 12 of the primary valve arm, while the pressure release hole 16 of the secondary valve is at the other side (that is opposite to said one side of the rotating shaft receiving holes 12) of the rotating shaft receiving holes 13 of the secondary valve arm, that is, the positions of the pressure release holes 15 and 16 with respect to the rotating shaft receiving holes 12 and 13 of their respective valve arms are opposite.

Referring to FIGS. 5-16, spring positioning grooves 17 exist on the back of the combined primary-secondary bonnet 11, a piston body 18 of the primary valve and a piston body 21 of the secondary valve.

Here, the spring positioning grooves 17 are used for arranging springs 30 with suitable strength between the combined primary-secondary bonnet 11 and the piston bodies 18, 21 of the primary and secondary valves.

Referring to FIGS. 9-20, a circular groove for piston body cup 20 used for receiving a piston body cup 23 is arranged on each of the piston body 18 of the primary valve and the piston body 21 of the secondary valve.

Referring to FIGS. 13-16, a circular protrusion 22 is arranged at the lower end of the piston body 21 of the secondary valve.

Referring to FIGS. 9-16, through holes 19 are arranged in both the piston body 18 of the primary valve and the piston body 21 of the secondary valve to connect the upper and lower parts of the assembled primary and secondary valve chambers 2, 3.

Referring to FIGS. 17-20, the piston body cup 23 is cone-shaped with a smaller end and a bigger end, can be expanded unidirectionally, and has an inclined cut 24.

Referring to FIGS. 21a-21c, 22-24 and 24a, notches 7 are arranged in a bottom plate 25 for piston body and a sealing plate 26 for piston body.

Referring to FIGS. 9-24, 24a, 31-38, two sealing plates 26 for piston body are respectively arranged under the piston body 18 of the primary valve and the piston body 21 of the secondary valve, and two bottom plates 25 for piston body are respectively arranged under these two sealing plates 26 for piston body, with the notches 7 on the bottom plates 25 and the sealing plates 26 facing towards the holes 19 in the respective piston bodies 18, 21. Two piston body cups 23 are respectively fitted within the grooves for piston body cup 20 on the piston body 18 of the primary valve and the piston body 21 of the secondary valve, with the bigger ends of the cups 23 facing downwards (i.e. facing the bottom plates 25), then screws 28 are used to pass through central screw holes of the piston bodies and the bottom plates for piston body, and then the piston bodies and the bottom plates for piston body are locked by nuts 29. In this way, a piston assembly of the primary valve and a piston assembly of the secondary valve are assembled.

Figure 122:
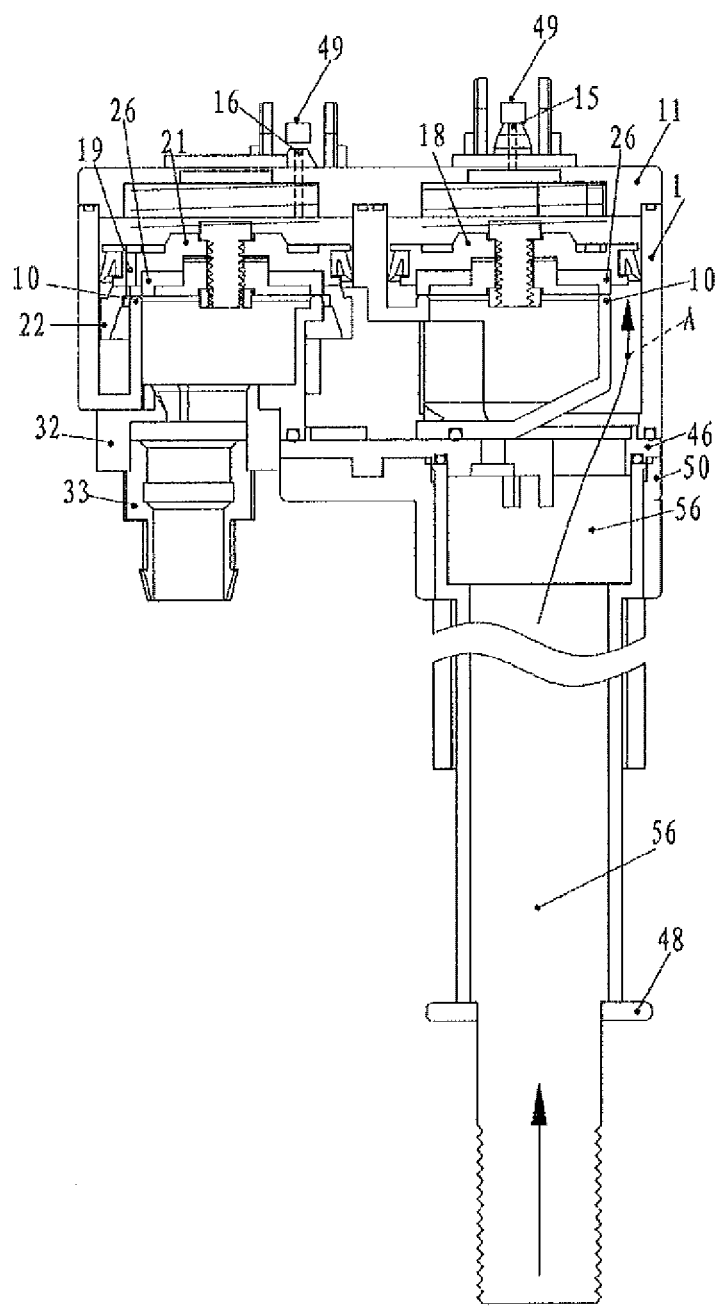
FIG. 122 is a schematic sectional view along the line A-A shown in FIG. 119 of the self-closing water saving device of the present invention when the primary and secondary valves are closed.

Referring to the foregoing figures and FIG. 122, the piston assembly of the primary valve is mounted in the primary valve chamber 2, and the piston assembly of the secondary valve is mounted in the secondary valve chamber 3, so that the bottom plates 25 for piston body therein are downward and through holes 19 in the piston assemblies are toward the notches 7 on valve ports 10 in valve chambers. Springs with suitable strength are arranged between the combined primary-secondary bonnet 11 and the piston bodies 18, 19 of the primary and secondary valves, and the upper end of the circular protrusion 22 of the piston body 21 for the secondary valve (from the piston assembly of the secondary valve) is just positioned at the lower end of the water outflowing slot 5 extending to the secondary valve chamber 3. In this case, when the piston assembly of the secondary valve moves upwards, the water outflowing slot 5 is blocked by the protrusion 22 of the piston body 21 of the secondary valve, that is, the water outflowing slot 5 is closed (see FIGS. 120 and 121). Then, proper sealing rings are placed in the sealing ring grooves 4 of the combined primary-secondary bonnet, and subsequently the combined primary-secondary bonnet 11 is fixed on the combined primary-secondary valve body 1 by means of screws. In this way, the inner mounting of the combined primary-secondary valve body 1 of the self-closing water saving device of the present invention is completed.

Referring to FIGS. 56-61, one end of the primary valve arm 37 and that of the secondary valve arm 41 are provided with their respective rubber plug receiving holes 39 (for valve arm) and valve arm rotating shaft receiving holes 38, and the other end of the primary valve arm 37 and that of the secondary valve arm 41 are provided with their respective pair of connection rod rotating shaft receiving holes 40.

Herein, the rubber plug receiving hole 39 is at one side of the valve arm rotating shaft receiving hole 38 on the primary valve arm 37, and the rubber plug receiving hole 39 is at the other side of the valve arm rotating shaft receiving hole 38 on the secondary valve arm 41, so that the rubber plug receiving hole 39 on the primary valve arm 37 and the rubber plug receiving hole 39 of the secondary valve arm 41 are opposite with respect to positions of their respective valve arm rotating shaft receiving holes 38. That is, the rubber plug receiving hole 39 of the primary valve arm 37 and the pressure release hole 15 of the primary valve on the combined primary-secondary bonnet 11 are at the same side with respect to the valve arm rotating shaft receiving hole, and the rubber plug receiving hole 39 of the secondary valve arm 41 and the pressure release hole 16 of the secondary valve on the combined primary-secondary bonnet 11 are at the same side with respect to the valve arm rotating shaft receiving hole.

Referring to FIGS. 62-67, a rotating shaft 43 is arranged on each of the primary valve connection rod 42 and the secondary valve connection rod 44, and a weight piece adjusting stud 45 is provided on the secondary valve connection rod 44.

Referring to FIGS. 68-72, a sealing ring groove 47 for a water inflowing tube is provided in an inner bottom plate 46 of the valve body.

Referring to FIGS. 75-78, a water inflowing tube receiving hole 51 is provided in an outer bottom plate 50 of the valve body.

Referring to FIGS. 50-67, 2, 74 and 125, two rubber plugs 49 for valve arm are first mounted in two rubber plug receiving holes 39 of the primary valve arm 37 and the secondary valve arm 41, respectively; the primary valve arm 37 and the secondary valve arm 41 are respectively mounted on the combined primary-secondary bonnet 11, with the rubber plugs 49 for valve arm on the primary and secondary valve arms 37, 41 being respectively located above the pressure release hole 15 of the primary valve and the pressure release hole 16 of the secondary valve, and the rotating shaft receiving holes 38 on the primary and secondary valve arms 37, 41 being respectively aligned with the rotating shaft receiving holes 12 of the primary valve arm and rotating shaft receiving holes 13 of the secondary valve arm on the combined primary-secondary bonnet 11; then two valve arm rotating shafts 36 are respectively inserted into the aligned rotating shaft receiving holes, and the rotating shafts 43 at one end of the primary valve connection rod 42 and that of the secondary valve connection rod 44 are respectively mounted in the corresponding connection rod rotating shaft receiving holes 40 on one end of the primary valve arm 37 and that of the secondary valve arm 41; finally, a weight piece 35 for adjustment is mounted to the weight piece adjusting stud 45 on the secondary valve connection rod 44. In this way, the mounting of the outer and upper portions of the combined primary-secondary valve body 1 of the self-closing water saving device of the present invention is completed.

Referring to FIGS. 1-4, 39, 40-49 and 125, a protruding end of an eccentric joint 32 is inserted into the eccentric joint receiving hole 9 in the bottom of the secondary valve of the combined primary-secondary valve body 1, a protruding end of a jet-propelling joint 33 is inserted into the eccentric joint 32, and a protruding end of an water outflowing joint 34 is then inserted into the water outlet 6 of the combined primary-secondary valve body 1.

Referring to FIGS. 1, 25, 26, 26a, 30, 68-72, 75-78, 91-93 and 129, a sealing ring 27 for the inner bottom plate of the valve body is placed in an inner bottom plate sealing ring groove 8 in the bottom of the combined primary-secondary valve body 1, the inner mounting of which has been completed; then the inner bottom plate 46 of the valve body, with the side provided with the sealing ring groove 47 for the water inflowing tube facing outwards, is pressed on the sealing ring 27 for the inner bottom plate of the valve body, and a sealing ring 31 for the water inflowing tube is then placed in the sealing ring groove 47 for the water inflowing tube in the inner bottom plate 46 of the valve body. A water inflowing tube 56 then extends into the water inflowing tube receiving hole 51 of the outer bottom plate 50 of the valve body, the side of the outer bottom plate 50 of the valve body provided with the water inflowing tube 56 is engaged with the inner bottom plate 46 of the valve body, and then they are fixed on the combined primary-secondary valve body 1 together by means of screws. Now, all of the inner and outer components of the combined primary-secondary valve body 1 are mounted completely, and thus a valve body assembly is formed.

Referring to FIGS. 79-86, a rotating foot receiving hole 53 is arranged in each of a left eccentric float rotating base 52 and a right eccentric float rotating base 54, and one left eccentric float rotating base 52 and one right eccentric float rotating base 54 are paired.

Referring to FIGS. 87-90, a floating body 55 includes feet 14.

Referring to FIGS. 91-93, at least one float can clip grooves 57 are provided at the water inflowing tube 56.

Referring to FIGS. 98-102, the float can 59 is composed of a primary valve part A and a secondary valve part B. A floating body receiving hole 61 and a pair of rotating base grooves 63 are provided at the bottom of each of the primary and secondary valve parts A and B, and a water inflowing tube receiving hole 60 is arranged outside the primary valve part A.

Here, an upper edge of the primary valve part A is lower than an upper edge of the secondary valve part B, and a connecting notch 62 therebetween is provided on the top of a wall shared by the primary valve part A and the secondary valve part B.

Referring to FIGS. 103-110, a pair of rotating feet 65 are arranged at the lower end of each of the primary and secondary valve floats 64 and 66, and a pair of connection rod rotating shaft receiving holes 40 are arranged on the upper end of each of the primary valve float 64 and the secondary valve float 66.

Referring to FIGS. 79-110, 125 and 129, two floating bodies 55 are first mounted in two floating body receiving holes 61 on the outer bottoms of the primary valve part A and the secondary valve part B of the float can 59; two pairs of float rotating bases are respectively inserted into two pairs of rotating base grooves 63 from the outer bottom of the float can 59; the primary valve float 64 is mounted into the primary valve part A of the float can 59 so that the pair of rotating feet 65 at the lower end of the primary valve float 64 are stuck in rotating foot receiving holes 53 of the pair of float rotating bases which are mounted securely; and the secondary valve float 66 is mounted into the secondary valve part B of the float can 59 so that the pair of rotating feet 65 at the lower end of the secondary valve float 66 are stuck in rotating foot receiving holes 53 of the pair of float rotating bases which are mounted securely. Thus, a float can assembly is formed.

The water inflowing tube 56 in the valve body assembly previously formed is inserted, at an aligned angle, into the water inflowing tube receiving hole 60 outside the primary valve part A of the float can in the float can assembly previously formed. Then, a float can clip 58 is engaged in the float can clip groove 57 on the water inflowing tube 56, and the rotating shafts 43 on the other ends of the primary valve connection rod 42 and the secondary valve connection rod 44 in the float can assembly are respectively mounted to the corresponding connection rod rotating shaft receiving holes 40 at upper ends of the primary valve float 64 and the secondary valve float 66. At last, a water inflowing tube gasket 48 is arranged around the lower part of the water inflowing tube 56, one end of a hose is connected to a water outlet of the water outflowing joint 34, and the other end of the hose is placed under the float can 59.

Figure 128:
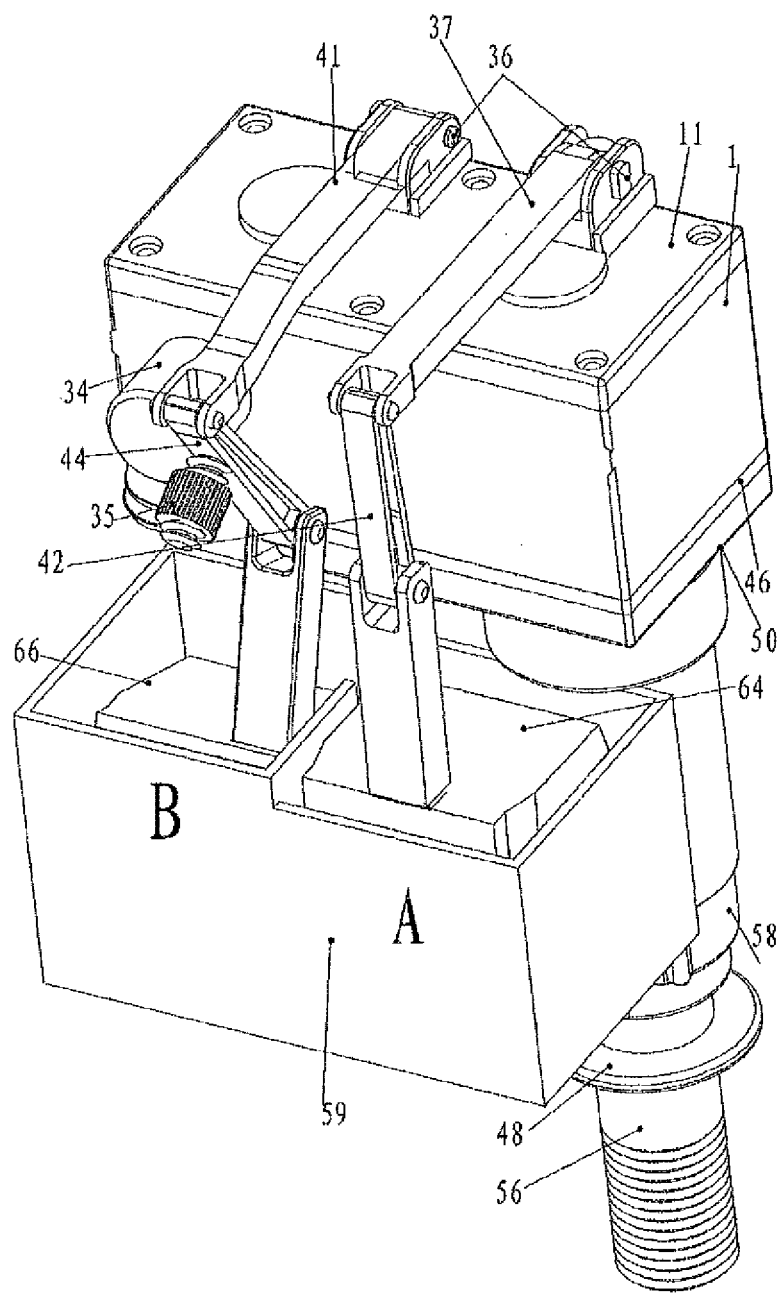
FIG. 128 is a schematic state view of each component of the self-closing water saving device at the end of the water flowing to the tank.
Figure 129:
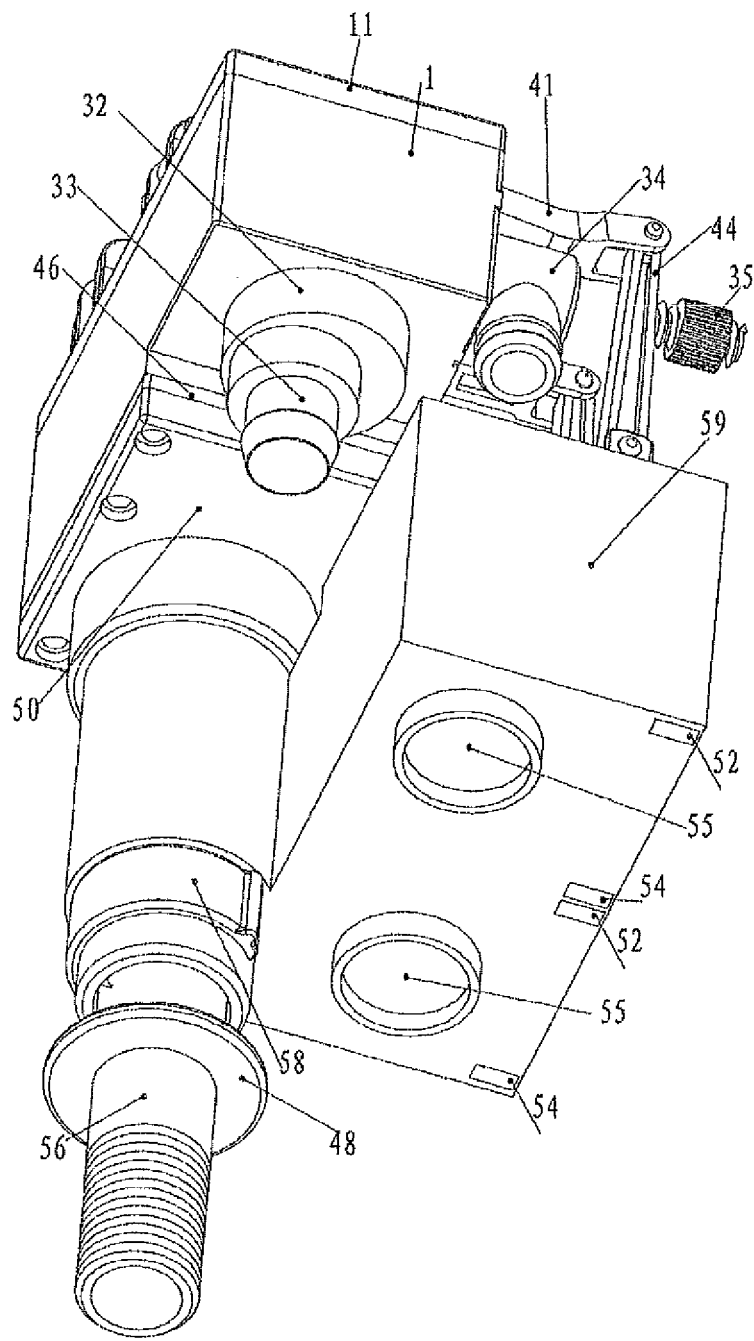
FIG. 129 is a schematic reverse-view structural drawing after various components of the self-closing water saving device are assembled integrally.

As such, all components of the self-closing water saving device of the present invention are completely mounted, as shown in FIGS. 128 and 129.

Figure 130:
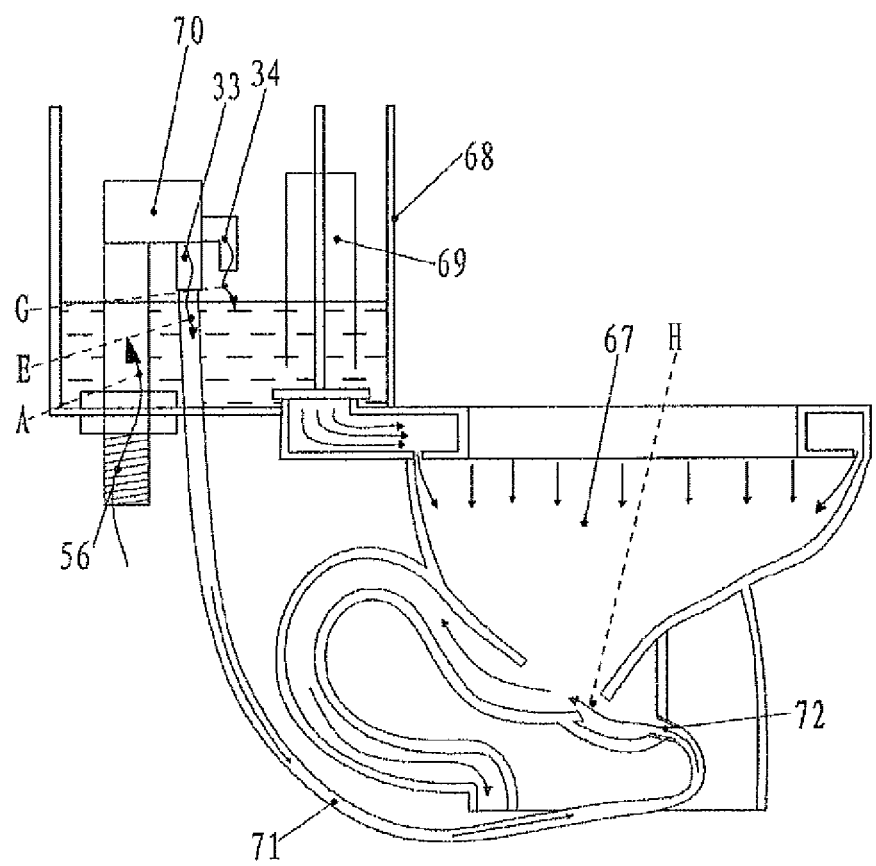
FIG. 130 is a schematic view of the toilet bowl mounted with the self-closing water saving device of the present invention.

Referring to FIG. 130, a toilet bowl 67 includes a jet orifice 72, and a water discharging assembly 69 is arranged in the tank 68. The self-closing water saving device 70 of the present invention is integrally mounted in the tank 68, except that one end of the water inflowing tube 56 with threads under the water inflowing tube gasket 48 is outside the tank and is connected to an external water source or the running water through a hose, and the jet-propelling joint 33 in the self-closing water saving device 70 of the present invention is connected to the jet orifice 72 in the toilet bowl 67 by a hose 71. As such, the toilet bowl equipped with the self-closing water saving device is completely mounted.

Operation principles of the primary and secondary valves within the self-closing water saving device of the present invention are roughly introduced as follows.

The opening and closing principles of the primary and secondary valves within the self-closing water saving device are the same as those of a valve within a common self-closing water-inflowing device or those of a common electromagnetic valve, where a pressure difference within a valve is controlled by opening or closing a pressure release hole so as to open or close the valve.

Figure 124:
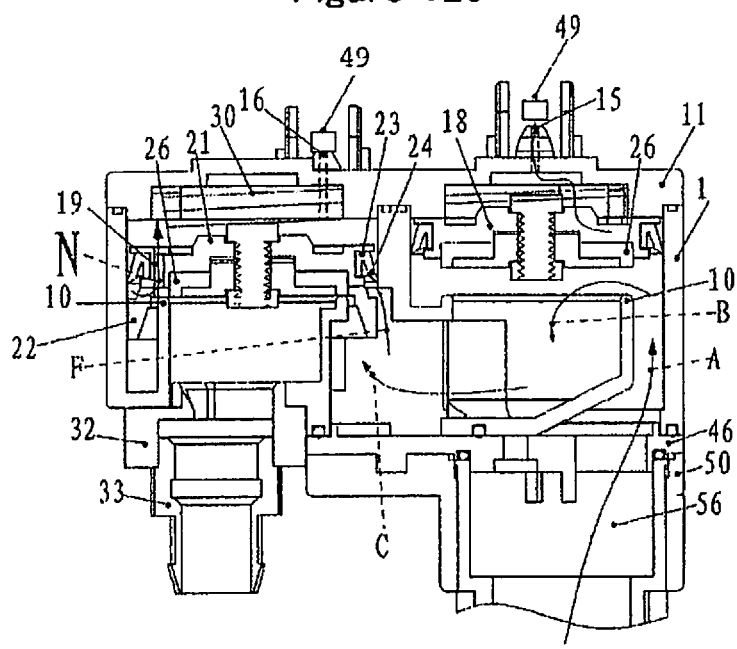
FIG. 124 is a schematic sectional view along the line A-A shown in FIGS. 118 and 119 of the self-closing water saving device of the present invention when the primary valve is opened and the secondary valves is closed.

Referring to the secondary valve part at the left side in FIG. 124, there exist water flows C and F in the peripheral water inflowing part of the secondary valve chamber 3. Since the piston body cup 23 is cone-shaped with a smaller end and a bigger end, can be expanded unidirectionally and has an inclined cut 24, the water flow F can cause the inclined cut 24 of the piston body cup 23 to expand but cannot pass through the inclined cut 24, so that the secondary valve chamber 3 is separated into upper and lower parts by the piston assembly of the secondary valve. Here, the water flow N can still arrive above the piston assembly of the secondary valve by passing through the through hole 19 in the piston body 21 of the secondary valve.

When the pressure release hole 16 is pressed by the rubber plug 49 for valve arm, that is, when the pressure release hole 16 is closed, the pressure intensity on the upper side of the piston assembly of the secondary valve within the secondary valve chamber 3 is substantially the same as that on the lower side of the piston assembly of the secondary valve due to the through hole 19. The stress area of the upper side of the piston assembly of the secondary valve is equal to the cross sectional area of the secondary valve chamber 3, while the stress area of the lower side of the piston assembly of the secondary valve is equal to the cross sectional area of the secondary valve chamber 3 minus that of the valve port 10, thus, the piston assembly of the secondary valve is subjected to a downward water pressure larger than an upward water pressure subjected, and would move downwards considering a further downward elastic force by the spring 30, that is, the piston body sealing plate 26 of the piston assembly of the secondary valve is pressed against the valve port 10, the secondary valve is hence in a close state.

Figure 123:
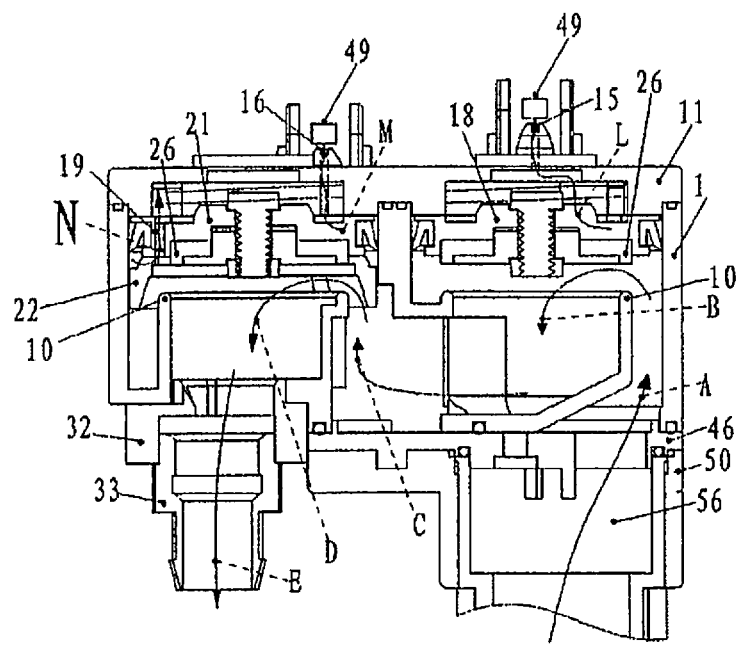
FIG. 123 is a schematic sectional view along the line A-A shown in FIG. 119 of the self-closing water saving device of the present invention when the primary and secondary valves are opened.

Referring to the secondary valve part at the left side in FIG. 123, when the pressure release hole 16 is separated from the rubber plug 49, that is, when the pressure release hole 16 is opened, a water flow M above the piston assembly of the secondary valve flows out through the pressure release hole 16. Despite that the water flow N can still pass through the hole 19 in the piston body 21 of the secondary valve to reach above the piston assembly of the secondary valve, the water flow N which passes through the hole 19 and reaches above the piston assembly of the secondary valve is insufficient to supplement the water flow M flowing out through the pressure release hole 16 since the pressure release hole 16 is much larger than the hole 19, thus the pressure intensity above the piston assembly of the secondary valve is reduced sharply. In this case, although the stress area of the upper side of the piston assembly of the secondary valve is still larger than that of the lower side thereof and there exists the downward elastic force by the spring 30, because the pressure intensity above the piston assembly of the secondary valve is reduced to cause that the sum of the downward water pressure experienced by the upper side of the piston assembly of the secondary valve and the downward elastic force by the spring 30 is less than the upward water pressure experienced by the lower side thereof, the piston assembly of the secondary valve moves upward, that is, the piston body sealing plate 26 of the piston assembly of the secondary valve is separated from the valve port 10, and namely, the secondary valve is opened.

Briefly, when the water flow exists, the secondary valve is closed once the pressure release hole 16 is closed, and the secondary valve is opened once the pressure release hole 16 is opened, and thus the opening and closing of the pressure release hole 16 controls the opening and closing of the secondary valve.

Figure 116:
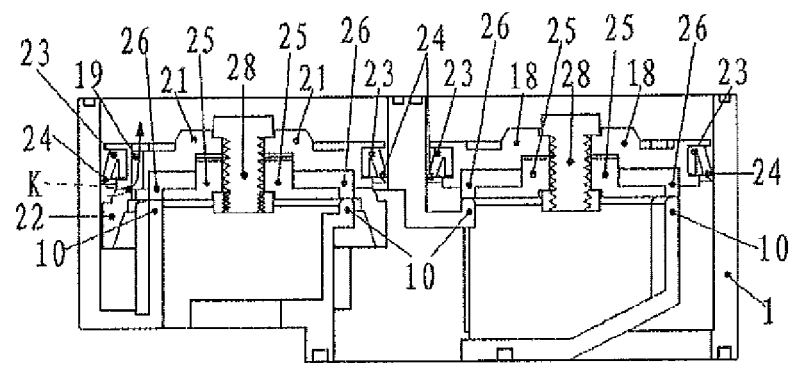
FIG. 116 is a sectional view along the line C-C shown in FIG. 115 of the self-closing water saving device of the present invention.
Figure 117:
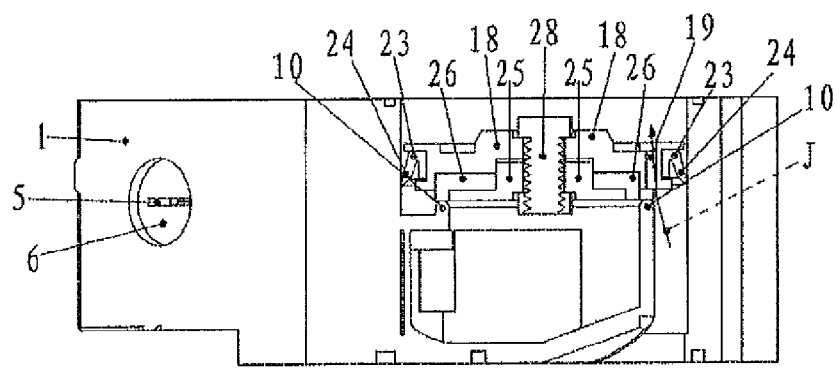
FIG. 117 is a sectional view along the line D-D shown in FIG. 115 of the self-closing water saving device of the present invention.
Figure 118:
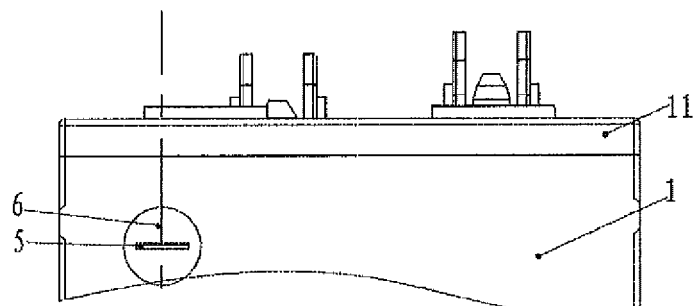
FIGS. 118 and 119 are top views of the combined primary-secondary valve body of the self-closing water saving device of the present invention.
Figure 119:
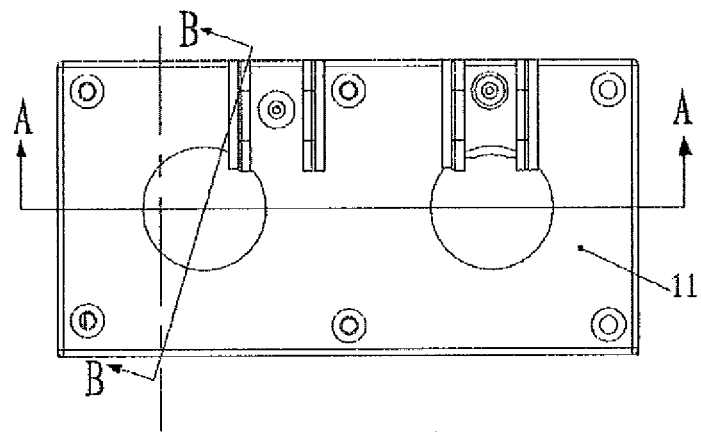

Comparing and referring to the primary valve part and the secondary part in FIG. 116 and FIG. 117, the primary valve and the secondary valve share the substantively same main structure and the same opening and closing principles. When water flow exists, the primary valve is closed when the pressure release hole 15 is closed, and the primary valve is opened when the pressure release hole 15 is opened, that is, the opening and closing of the pressure release hole 15 controls the opening and closing of the primary valve.

Various states and operation principles of each component of the valve control mechanism outside of the valve body at different moments are introduced as follows when the self-closing water saving device 70 of the present invention is mounted in the tank 68 of the toilet bowl 67.

Figure 112:
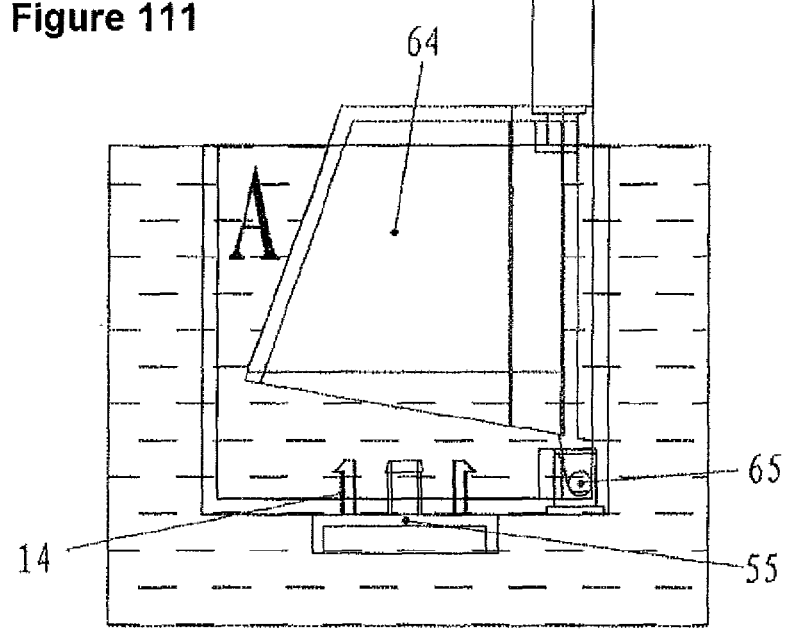
FIG. 112 shows a schematic state in which the float and the floating body of the primary valve are inside or outside the float can when there is water in the tank.
Figure 114:
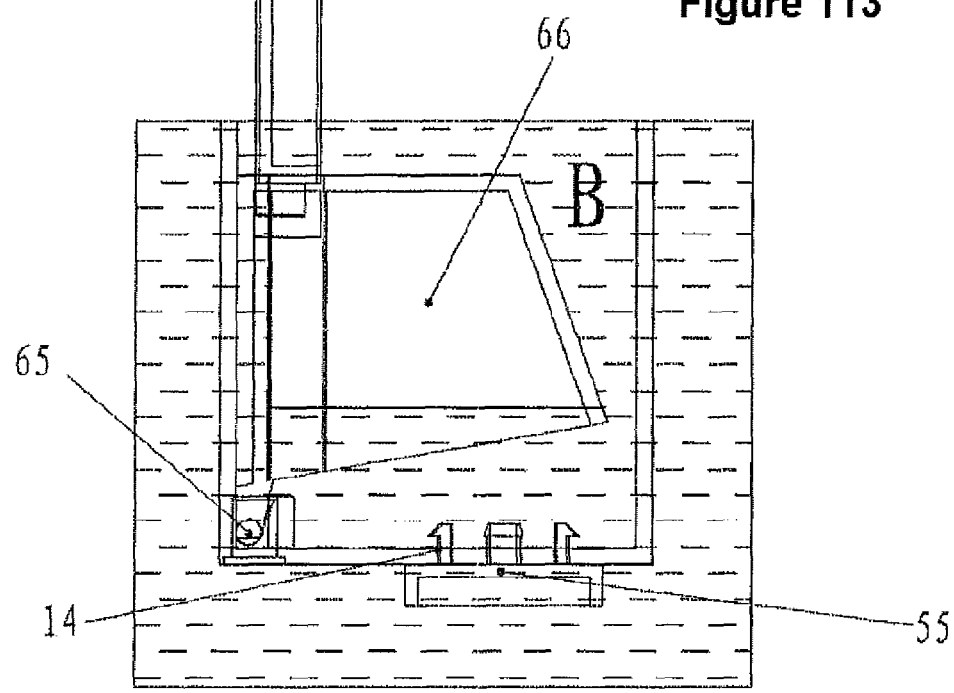
FIG. 114 shows a schematic state in which the float and the floating body of the secondary valve are inside or outside the float can when there is water in the tank.
Figure 115:
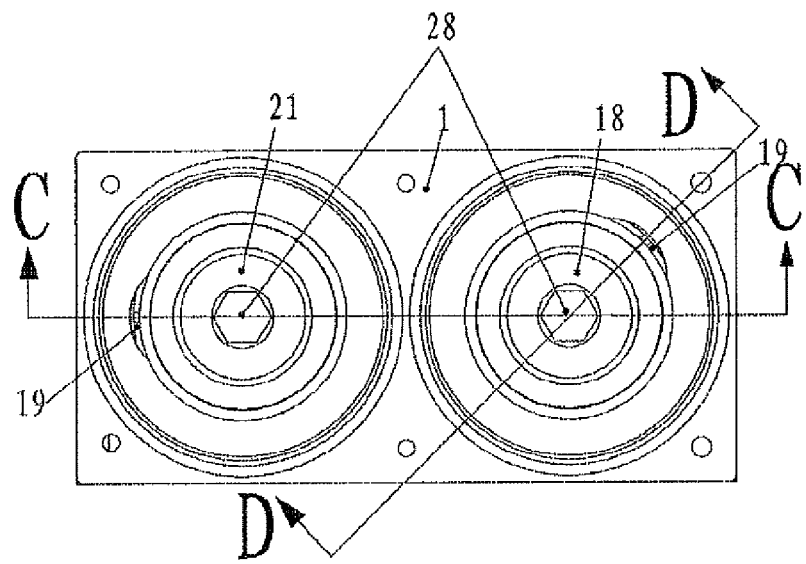
FIG. 115 is a top view of the combined primary-secondary valve body provided with the primary and secondary valve piston assemblies of the self-closing water saving device of the present invention.

Referring to FIGS. 112 and 114, when the tank is filled with water, that is, there is water within the float can 59, both the primary valve float 64 and the secondary valve float 66 uplift and rotate along the rotating feet 65 to an upright state due to a buoyance effect and the floating bodies 55 under the floats 64 and 66 rise respectively to an uplifting state. Here, the secondary valve float 66 is completely merged inside the secondary valve part B of the float can 59 and there is still a certain distance between the top of the secondary valve float 66 and the upper edge of the secondary valve part B when the secondary valve float 66 uplifts to its highest position.

Figure 111:
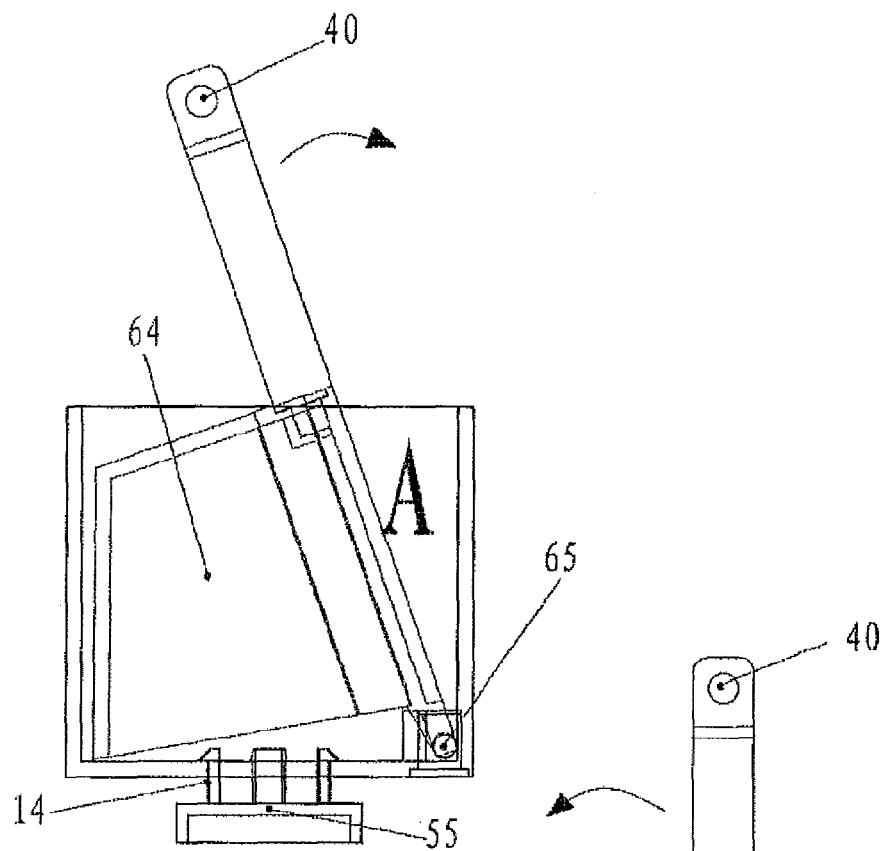
FIG. 111 shows a schematic state in which the float and the floating body of the primary valve are inside and outside the float can when there is no water in the tank.
Figure 113:
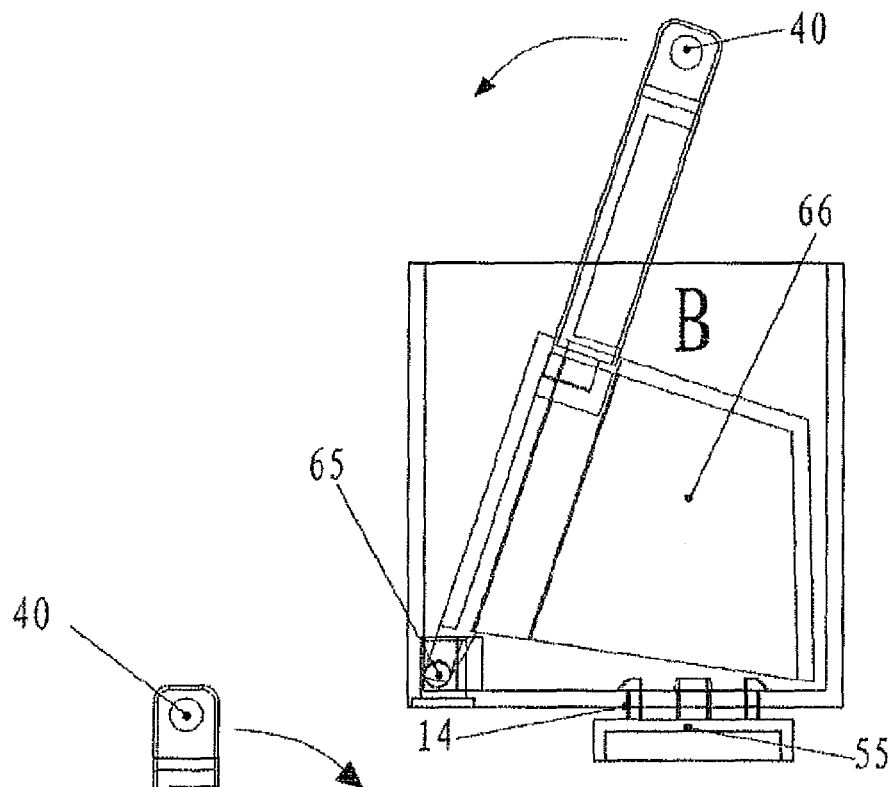
FIG. 113 shows a schematic state in which the float and the floating body of the secondary valve are inside or outside the float can when there is no water in the tank.

Referring to FIGS. 111 and 113, when the water is discharged from the tank, the floating bodies 55 move downward due to the absence of the buoyance effect, water inside the float can 59 flows out of the floating body receiving holes 61 in the bottom thereof. When the float can 59 is emptied, the primary valve float 64 and the secondary valve float 66 are free of the buoyance effect, and rotate along the rotating feet 65 to an inclined state.

Comparing and referring to the feet 14 of the floating body 55 in FIG. 111 and the feet 14 of the floating body 55 in FIG. 113, the feet 14 of the floating body 55 at the outer bottom of the secondary valve part B is shorter than the feet 14 of the floating body 55 at the outer bottom of the primary valve part A, that is, the distance by which the floating body 55 at the outer bottom of the secondary valve part B moves downwards is less. Therefore, the opening size of the floating body receiving hole 61 at the bottom of the secondary valve part B is less when water is discharged from the tank.

Figure 125:
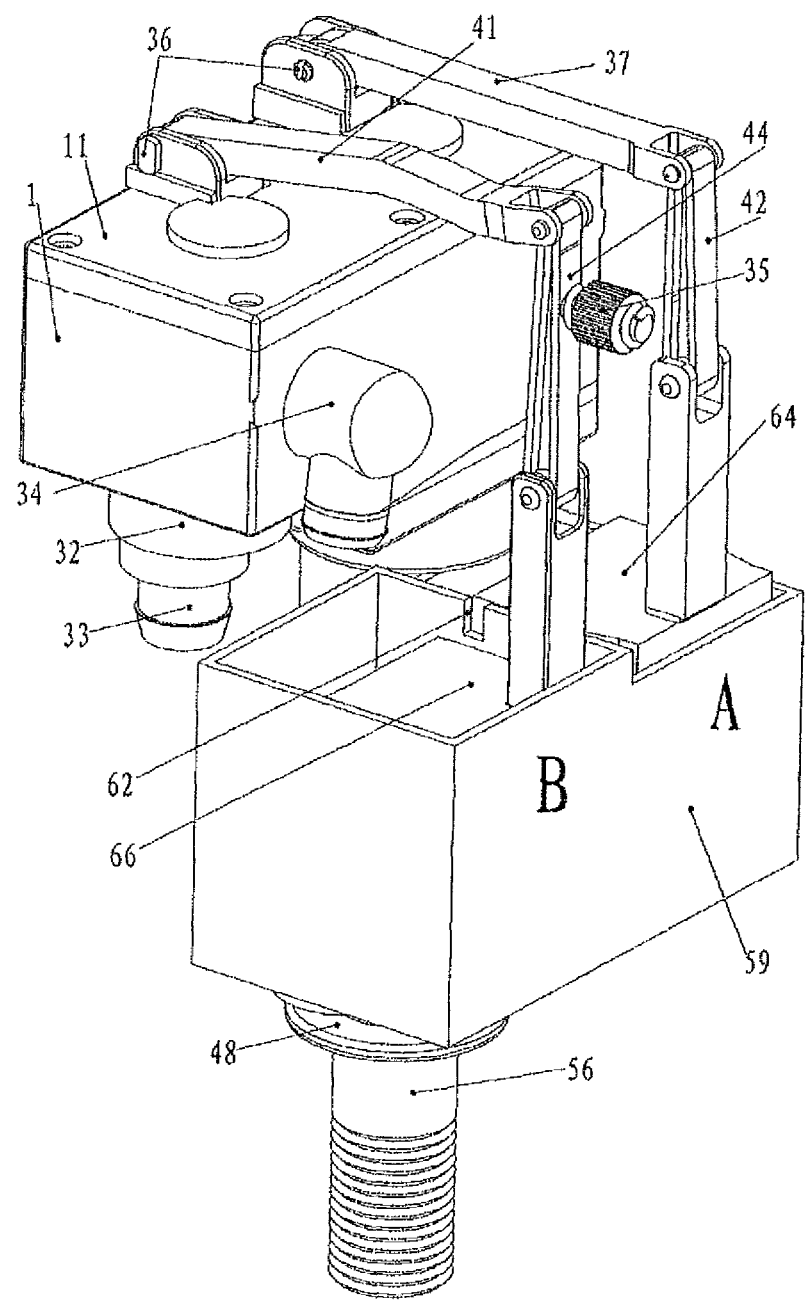
FIG. 125 is a schematic state view of each component of the self-closing water saving device when the tank is filled with water.

Referring to FIG. 125, when the primary and secondary valve floats 64 and 66 rotate to the upright state after the tank is filled with water, both the primary valve connection rod 42 and the secondary valve connection rod 44 are in the upright state, and the end of the primary valve arm 37 and that of the secondary valve arm 41, which are respectively connected movably to the primary valve connection rod 42 and the secondary valve connection rod 44, are rotated upwards.

Figure 127:
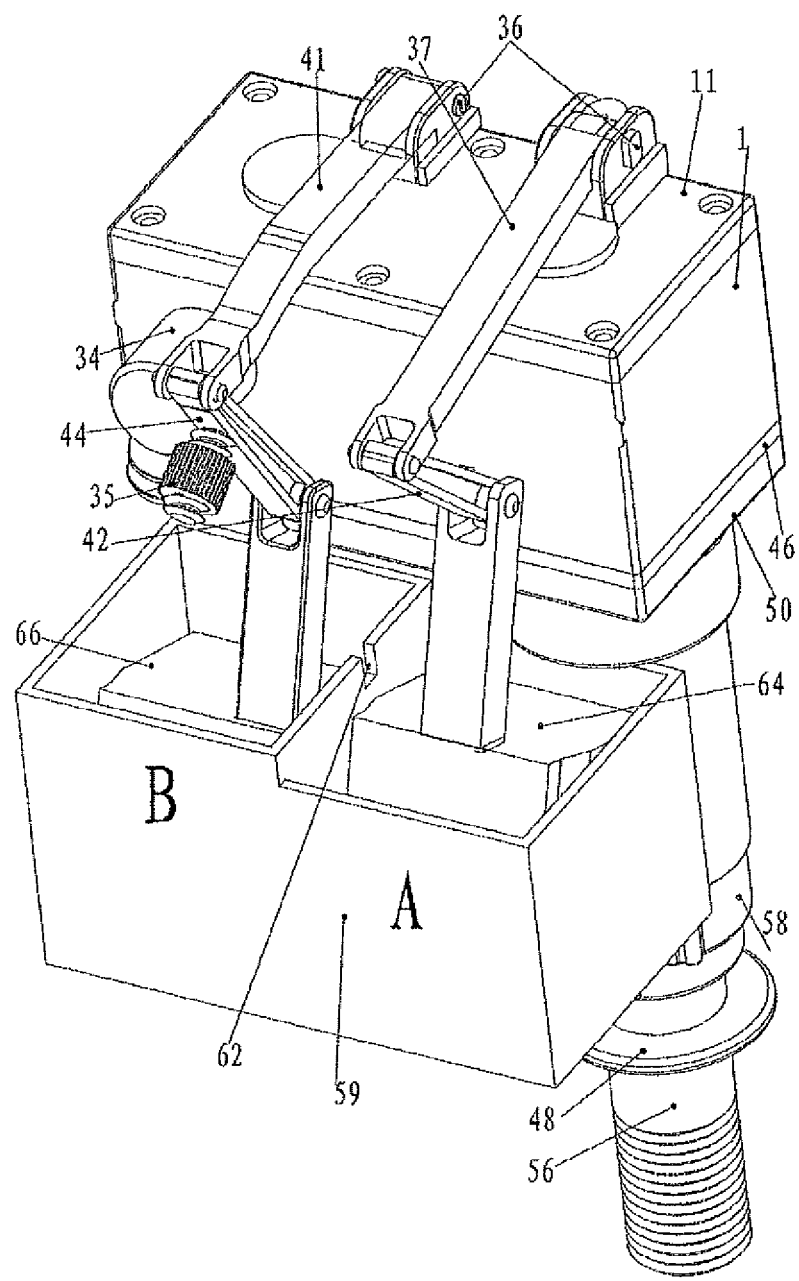
FIG. 127 is a schematic state view of each component of the self-closing water saving device when water flows in the tank.

Referring to FIG. 127, when the primary and secondary valve floats 64 and 66 rotate to the inclined state after the tank is emptied, both the primary valve connection rod 42 and the secondary valve connection rod 44 are in the inclined state, and the end of the primary valve arm 37 and that of the secondary valve arm 41, which are respectively connected movably to the primary valve connection rod 42 and the secondary valve connection rod 44, are rotated downwards.

Figure 131:
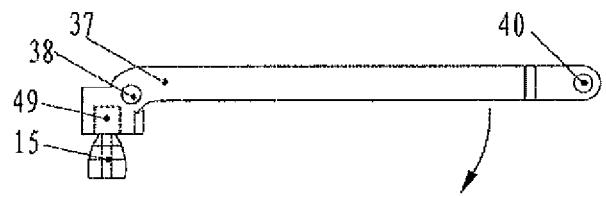
FIG. 131 is a schematic state view when the rubber plug for valve arm in the primary valve arm closes a pressure release hole of the primary valve.
Figure 132:
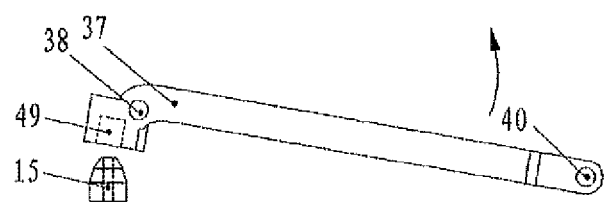
FIG. 132 is a schematic state view when the rubber plug for valve arm in the primary valve arm opens the pressure release hole of the primary valve.

Referring to FIGS. 131 and 132, if one end of the primary valve arm 37, that is provided with the connection rod rotating shaft receiving hole 40, is rotated upwards, the other end of the primary valve arm 37 that is provided with the rubber plug 49 is rotated downwards, so that the pressure release hole 15 of the primary valve on the combined primary-secondary bonnet 11 is pressed by the rubber plug 49 on the primary valve arm 37 by means of leverage and hence is closed; and conversely, if the end of the primary valve arm 37 that is provided with the connection rod rotating shaft receiving hole 40 is rotated downwards, the pressure release hole 15 is opened.

Figure 133:
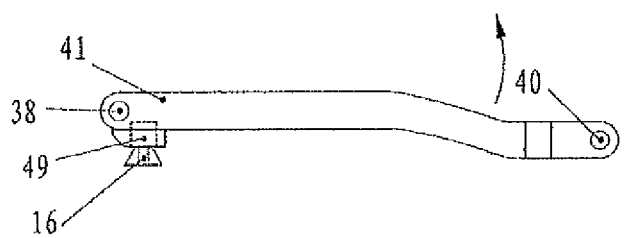
FIG. 133 is a schematic state view when the rubber plug for valve arm in the secondary valve arm closes a pressure release hole of the secondary valve.
Figure 134:
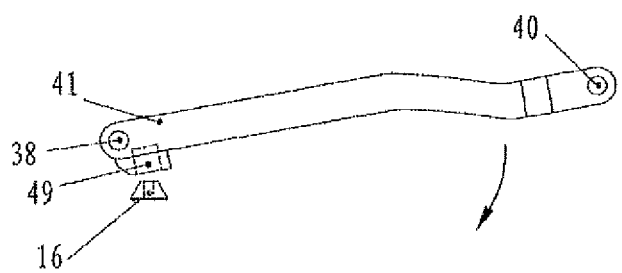
FIG. 134 is a schematic state view when the rubber plug for valve arm in the secondary valve arm opens the pressure release hole of the secondary valve.

Referring to FIGS. 133 and 134, if one end of the secondary valve arm 41, that is provided with the connection rod rotating shaft receiving hole 40, is rotated upwards, the rubber plug 49 on the secondary valve arm 41 is rotated, upwards and hence is separated from the pressure release hole 16 of the secondary valve on the combined primary-secondary bonnet 11 by a small distance, that is, the pressure release hole 16 is opened; and conversely, if the end of the secondary valve arm 41 that is provided with the connection rod rotating shaft receiving hole 40 is rotated downwards, the pressure release hole 16 is closed.

Briefly, the pressure release hole 15 of the primary valve is closed when the primary valve float 64 uplifts and rotates to the upright state, but is opened when the primary valve float 64 rotates downward to the inclined state; while the pressure release hole 16 of the secondary valve is opened when the secondary valve float 66 uplifts and rotates to the upright state, but is closed when the secondary valve float 66 rotates downward to the inclined state.

It can be seen from the foregoing operation principles of the primary and secondary valves that: the primary valve is closed when the primary valve float 64 uplifts and rotates to the upright state, but is opened when the primary valve float 64 rotates downwards to the inclined state; and the secondary valve is opened or in an openable state when the secondary valve float 66 uplifts and rotates to the upright state, but is closed when the secondary valve float 66 rotates downwards to the inclined state.

The operation process of the self-closing water saving device 70 of the present invention that is integrally mounted in the tank 68 of the toilet bowl 67 is described as follows.

Figures 120, 121:
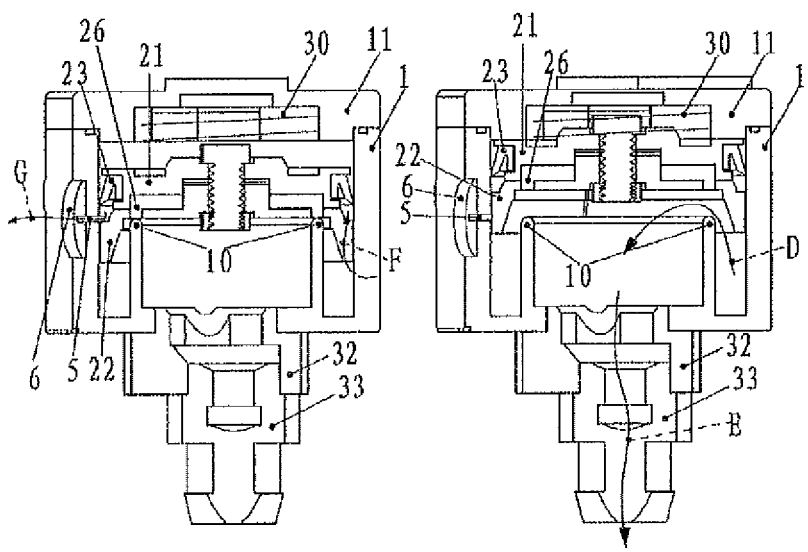
FIG. 120 is a sectional view along the line B-B shown in FIG. 119 of the self-closing water saving device of the present invention when the secondary valve is closed.
FIG. 121 is a sectional view along the line B-B shown in FIG. 119 of the self-closing water saving device of the present invention when the secondary valve is opened.

Referring to FIGS. 111, 113, 127 and 130, when there is no water in the tank 68 of the toilet bowl 67, the state of each outer component of the self-closing water saving device 70 of the present invention at that time is shown in FIG. 127, in which the primary valve float 64 and the secondary valve float 66 are in the inclined state. Referring to FIGS. 124, 132 and 133, the pressure release hole 15 of the primary valve is opened and the pressure release hole 16 of the secondary valve is closed; at this time, when water from the external water source or running water flows into the tank through the end of the water inflowing tube 56 that is outside the tank and contains threads, the water flow A causes the piston assembly of the primary valve to move upwards, that is, the piston body sealing plate 26 on the piston assembly of the primary valve is separated from the valve port 10 in the primary valve chamber 2, then the water flow B flows in the valve port 10, and thus the water flow C flows into the peripheral water inflowing part of the secondary valve chamber 3 and the water flow F flows over the protrusion 22 at the lower end of the piston body 21 of the secondary valve. Referring to FIG. 120, the water flow F reaches the water outflowing slot 5 along the upper side of the protrusion 22 and the water flow G flows out of the water outflowing slot 5. The water flow G flows through the water outflowing joint 34 and the hose, and finally to the tank, thus the tank gets into a water-in state. At this time, the secondary valve cannot be opened since the pressure release hole 16 of the secondary valve is closed. The state of each inner component of the self-closing water saving device 70 of the present invention at this time is shown in FIGS. 124 and 120.

Referring to FIG. 128, the water level in the tank rises gradually as the water flow G continuously flows into the tank through the water outflowing joint 34 and the hose. Because of the floating bodies 55 acting as check valves respectively arranged at the outer bottoms of the primary valve part A and the secondary valve part B of the float can 59, water does not flow into the primary valve part A and the secondary valve part B, except for only a little percolation water which is insufficient to generate the enough buoyance to uplift and rotate the primary valve float 64 and the secondary valve float 66, in the process that the water level in the tank rises to the upper edge from the bottom of the floating can 59. The water flow does not enter into the primary valve part A from its upper edge until the water level reaches the upper edge of the primary valve part A, and the primary valve float 64 in the primary valve part A uplifts and rotates due to the buoyance effect by water flowing in, so that the pressure release hole 15 of the primary valve is closed and finally the primary valve is closed. After the primary valve is closed, the source of the water flow G is cut off, no water flows out of the water outflowing joint 34 and the hose, and the supplying of the water to the tank is stopped. At that time, the state of each outer component of the self-closing water saving device 70 of the present invention is shown in FIG. 128.

Referring to FIGS. 125 and 122, since the upper edge of the primary valve part A of the float can 59 is lower than that of the secondary valve part B of the float can 59, water cannot flow into the secondary valve part B when water starts to flow into the primary valve part A. Water does not flow into the secondary valve part B from a small notch 62 connecting the primary valve part A with the secondary valve part B until the primary valve part A is filled with water, that is, until the primary valve float 64 uplifts and rotates to close the primary valve. When the secondary valve part B is almost filled with water, the secondary float 66 in the secondary valve part B uplifts and rotates due to the buoyance effect so that the pressure release hole 16 of the secondary valve is opened, and at this time, the primary valve has been closed, thus the secondary valve would not be opened in the absence of inflowing water although the pressure release hole 16 is opened, and the secondary valve is only in a state to be opened, and will be opened immediately only if a water flow enters in from the water outlet of the primary valve. A state of each outer component of the self-closing water saving device 70 of the present invention at that time is shown in FIG. 125, and a state of each inner component thereof at that time is shown in FIG. 122.

Figure 126:
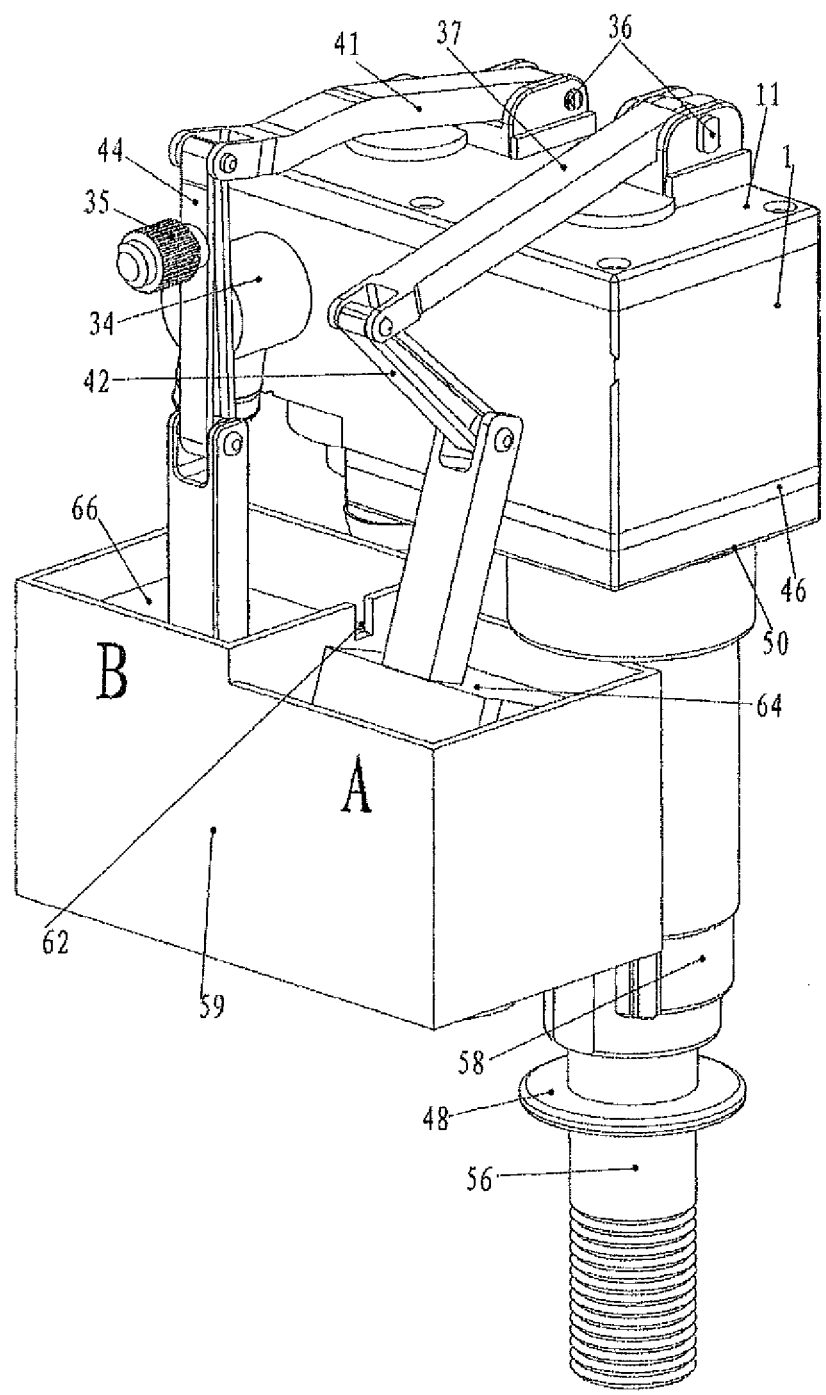
FIG. 126 is a schematic state view of each component of the self-closing water saving device at the beginning that the tank discharges water.

Referring to FIGS. 126 and 123, when the water discharging assembly 69 in the tank 68 is opened to initiate water discharging from the tank, the floating body 55 at the outer bottom of the primary valve part A of the float can 59 moves downwards due to the absence of the buoyance effect as the water level in the tank drops rapidly, the water in the primary valve part A is drained quickly, and thereupon the primary valve float 64 rotates downwards immediately, so that the pressure release hole 15 of the primary valve is opened, the water flow A causes the piston assembly of the primary valve to move upwards, that is, the piston body sealing plate 26 of the piston assembly of the primary valve is separated from the valve port 10 in the primary valve chamber 2, the water flow B flows into the valve port 10 of the primary valve chamber 2, and thus the water flow C flows into the peripheral water inflowing part of the secondary valve chamber 3; and at the same time, a little water flow L flows out of the pressure release hole 15 of the primary valve and into the tank.

As the water level inside the tank drops rapidly during the water discharging of the tank, the floating body 55 at the outer bottom of the secondary valve part B of the float can 59 moves simultaneously downwards due to the lose of the buoyance effect. However, because the feet 14 of the floating body 55 at the outer bottom of the secondary valve part B is shorter than those of the floating body 55 at the outer bottom of the primary valve part A, the distance by which the floating body 55 at the outer bottom of the secondary valve part B moves downward is less, that is, the opening size of the floating body receiving hole 61 in the bottom of the secondary valve part B is less. In addition, there exists some water between the top of the secondary valve float 66 and the upper edge of the secondary valve part B, thus the water in the secondary valve part B would not be drained immediately and the secondary valve float 66 is in an uplifting state i.e., a state that the pressure release hole 16 of the secondary valve is maintained open, in a certain time period; when the water flow C flows into the peripheral water inflowing part of the secondary valve chamber 3, the water flow C causes the piston assembly of the secondary valve to move upwards, that is, the piston body sealing plate 26 of the piston assembly of the secondary valve is separated from the valve port 10 of the secondary valve chamber 3, namely, the secondary valve is opened, so that the water flow D flows into the valve port 10 in the secondary valve chamber 3 and the water flow E flows out of the jet-propelling joint 33, and further, a tiny water flow M flows out of the pressure release hole 16 of the secondary valve and into the tank. The state of each outer component of the self-closing water saving device 70 of the present invention is shown in FIG. 126, and the state of each inner component thereof is shown in FIG. 123.

Referring to FIG. 130, with the hose 71, the water flow E from the jet-propelling joint 33 results in the water flow H jetted from the jet orifice 72 in the toilet bowl 67, so as to propel the water which is discharged by the tank and flows into the water trap or the bottom of the water trap, or the bottom of the sewer.

Referring to FIG. 121, when the piston assembly of the secondary valve moves upwards, that is, when the secondary valve is opened, the circular protrusion 22 at the lower end of the piston body 21 of the secondary valve also moves upwards, and thus the water outflowing slot 5 is blocked to prevent the water flow from flowing into the tank through the water outflowing slot 5, which maximizes the pressure of the water flow E from the jet-propelling joint 33.

Referring to FIGS. 124, 127 and 120, the water in the secondary valve part B of the float can 59 is drained gradually after a while, and the secondary valve float 66 therein rotates downwards due to the absence of the buoyance effect, so that the pressure release hole 16 of the secondary valve is closed, that is, the secondary valve is closed and the piston assembly of the secondary valve moves downwards, namely, the circular protrusion 22 at the lower end of the piston body 21 of the secondary valve moves downwards, so that the blocked water outflowing slot 5 is reopened, the water flow F reaches the water outflowing slot 5 along the upper side of the protrusion 22, and the water flow G flows out of the water outflowing slot 5 and finally flows into the tank through the water outflowing joint 34 and the hose, so that the tank enters into the water-inflow state again. The state of each outer component of the self-closing water saving device 70 of the present invention is shown in FIG. 127, and the state of each inner component thereof is shown in FIGS. 124 and 120.

So far, all components of the self-closing water saving device 70 of the present invention have begun a next operation cycle.

Additionally, the upper edge of the primary valve part A of the float can 59 is designed to be lower than, rather than flush with, that of the secondary valve part B of the float can 59, in order that water does not flow into both of the primary and second valve parts at the same time when the water level in the tank rises. If water flew into both of them at the same time, the secondary valve float 66 rotates upwards immediately, that is, the secondary valve is opened. At this time, however, although the primary valve float 64 rotates upwards at once synchronously, the primary valve would not be closed immediately, and thus the secondary valve is opened temporarily, which leads to temporary outflowing of water out of the jet-propelling joint 33.

Those skilled in the valve art can change the specific inner structure of the present invention by changing the inner components of the valve, such as, exchanging the positions of the piston assemblies of the primary and secondary valves, or either merely the piston assemblies of the primary valves or merely the piston assemblies of secondary valves are used; or integrally changing the piston movable structure of the piston assemblies of the primary and secondary valves to a cup movable structure, like an inner structure of a common self-closing water-in device or a common electromagnetic valve. Above changes all fall in the scope of the present invention.

The invention claimed is:

1. A self-closing water saving device for mounting in a tank of a toilet bowl, which is used for supplying water to the tank, which comprises:
   a water inlet adapted to be connected to an external water source;
   a water outlet adapted to provide water to the tank;
   a jet-propelling port for jetting water to a bottom of a water trap of a toilet bowl or a bottom of a sewer;
   wherein, the water jetted from the jet-propelling port is used to propel the water which is discharged from the tank and flows into the bottom of the water trap or the bottom of the sewer;
   a primary valve float can, a secondary valve float can, a primary valve float and a secondary valve float;
   wherein, the secondary valve float is placed in the secondary valve float can, and the primary valve float is placed in the primary valve float can; and
   wherein opening and closing of the secondary valve is controlled by the secondary valve float, opening and closing of the primary valve is controlled by the primary valve float, and a floating body receiving hole in which a floating body acting as a check valve is arranged is provided at bottom of each of the primary and secondary valve float cans.

2. The self-closing water saving device of claim 1, wherein, the self-closing water saving device has a structure with a primary valve and a secondary valve in series, a water flow from the primary valve flows to the secondary valve, and successively or synchronously flows to the jet-propelling port and the water outlet via the secondary valve.

3. The self-closing water saving device of claim 2, wherein, when a discharging assembly in the tank is opened to discharge water to the water trap of the toilet bowl, both the primary valve and the secondary valve are opened, then the secondary valve is closed, and subsequently the primary valve is closed when the tank is filled with water.

4. The self-closing water saving device of claim 2, wherein, a water inflowing part inside the secondary valve includes a water outflowing slot in communication with an outside of a body of the secondary valve.

5. The self-closing water saving device of claim 4, wherein, the water outflowing slot is blocked when the secondary valve is opened.

6. The self-closing water saving device of claim 1, wherein, the secondary valve float is completely inside the secondary valve float can and there is still distance between a top of the secondary valve float and an upper edge of the secondary valve float can when the secondary valve float uplifts to its highest position, wherein, an upper edge of the primary valve float can is lower than that of the secondary valve float can, and water does not flow to the secondary valve float can until the primary valve float can is filled with water.

7. The self-closing water saving device of claim 1, wherein, the primary valve is closed when the primary valve float uplifts, and is opened when the primary valve float drops; the secondary valve is in an openable state or opened when the secondary valve float uplifts, and is closed when the secondary valve float drops; an opening size of a check valve of the secondary valve float can is less than that of a check valve of the primary valve float can, and the secondary valve float drops after the primary valve float has dropped for a time period.

8. A self-closing water saving device, which comprises:
   a water inlet adapted to be connected to an external water source;
   a water outlet adapted to provide water to a tank;
   a jet-propelling port for jetting water to a bottom of a water trap of a toilet bowl or a bottom of a sewer; and
   a primary valve and a secondary valve which are float-controlled valves, wherein, a water inflowing part of the secondary valve is in communication with a water outflowing part of the primary valve, a secondary valve float is completely inside a secondary valve float can and there is still distance between a top of the secondary valve float and an upper edge of the secondary valve float can when the secondary valve float uplifts to its highest position, the upper edge of the secondary valve float can is higher than that of the primary valve float can, water is not allowed to flow to the secondary valve float can until the primary valve float can is filled with water, an opening size of a check valve of the secondary valve float can is less than that of a check valve of the primary valve float can, the secondary valve float drops after the primary valve float has dropped for a time period, a connection rod mechanism of the secondary valve is adapted to open a hole in a secondary valve bonnet along with uplifting of the secondary valve float, a connection rod mechanism of the primary valve is adapted to close a hole in a primary valve bonnet along with uplifting of the primary valve float, a water outflowing part of the secondary valve is in communication with the jet-propelling port, and the secondary valve further includes a water outflowing slot which is in communication with a water outlet through which water flows out to the tank.

9. A toilet bowl, including a tank and a water trap, which comprises:
   a jet-propelling orifice arranged in the water trap, a bottom of the water trap, or a bottom of a sewer; and
   a self-closing water saving device of claim 1 arranged in the tank, wherein the self-closing water saving device includes a water inlet adapted to be connected to an external water source, a water outlet adapted to provide water to the tank and a jet-propelling port for jetting water to the bottom of the water trap or the bottom of the sewer, wherein the jet-propelling port is connected to the jet-propelling orifice.

10. A water saving method for a toilet bowl, a tank of which receives a self-closing water saving device of claim 8, provided that the tank does not contain water initially, the method comprising the steps of:
   (a) opening a hole in the primary valve bonnet, and closing a hole in the secondary valve bonnet;
   (b) supplying water to a water inflowing part of the primary valve from an external water source, with the primary valve being kept open and the secondary valve being kept closed, so that water from the water inflowing part of the primary valve flows through a valve port of the primary valve, a water outflowing part of the primary valve, a water inflowing part of the secondary valve and a water outflowing slot of the secondary valve, and finally into the tank;
   (c) uplifting the primary valve float as a water level in the tank rises gradually and water in the tank flows into the primary valve float can, which causes the connection rod mechanism to close the hole in the primary valve bonnet and stop supplying water to the tank;
   (d) guiding water in the tank to the secondary valve float can, to cause a float in the secondary valve float can to uplift, wherein the uplifted float causes the connection rod mechanism to open the hole in the secondary valve bonnet, so that the secondary valve is maintained at an openable state;
   (e) opening a water discharging assembly of the toilet bowl to discharge the water in the tank into the water trap of the toilet bowl;
   (f) opening a check valve when the water level in the tank drops, wherein, a-water discharging velocity of the primary valve float can is larger than that of the secondary valve float can;
   (g) driving the connection rod mechanism by a drop of the primary valve to open the hole in the primary valve bonnet, so that the primary valve is maintained in an openable state, and simultaneously controlling a water discharging velocity of the secondary valve float can to keep the hole in the secondary valve bonnet open and hence keep the secondary valve in an openable state;
   (h) supplying water to the water inflowing part of the primary valve from the external water source again, to cause the water flow from the water inflowing part of the primary valve to flow through the port of the primary valve, the water outflowing part of the primary valve, the water inflowing part of the secondary valve, the valve port of the secondary valve and the water outflowing part of the secondary valve, and then into the jet-propelling port or respectively into the water outflowing slot of the secondary valve and the jet-propelling port, wherein, the water from the water outflowing slot of the secondary valve flows into the tank, and the water jetted from the jet-propelling port propels the water which is discharged from the tank and flows into the water trap, the bottom of the water trap, or the bottom of the sewer; and
   (i) controlling the water discharging velocity of the secondary valve float can to control a water jetting time of the jet-propelling port, and driving the connection rod mechanism by the drop of the float in the secondary valve float can to close the hole in the secondary valve bonnet, and hence close the secondary valve, when a preset time period of water jetting elapses.

11. A toilet bowl including a tank and a water trap, which comprises:
   a jet-propelling orifice arranged in the water trap, a bottom of the water trap, or a bottom of a sewer; and
   a self-closing water saving device of claim 8 arranged in the tank, wherein the self-closing water saving device includes a water inlet adapted to be connected to an external water source, a water outlet adapted to provide water to the tank and a jet-propelling port for jetting water to the bottom of the water trap or the bottom of the sewer, wherein the jet-propelling port is connected to the jet-propelling orifice.

* * * * *